US009336749B2

(12) United States Patent
Vetsuypens et al.

(10) Patent No.: US 9,336,749 B2
(45) Date of Patent: May 10, 2016

(54) DISPLAY DEVICE AND MEANS TO MEASURE AND ISOLATE THE AMBIENT LIGHT

(75) Inventors: Arnout Robert Leontine Vetsuypens, Denderbelle (BE); Olivier Jacques Achille Charlier, Brussels (BE); Wouter M. F. Woestenborghs, Wachtebeke (BE)

(73) Assignee: Barco N.V., Kortrijk (BE)

( * ) Notice: Subject to any disclaimer, the term of this patent is extended or adjusted under 35 U.S.C. 154(b) by 112 days.

(21) Appl. No.: 13/977,761

(22) PCT Filed: Jan. 2, 2012

(86) PCT No.: PCT/EP2012/050029
§ 371 (c)(1),
(2), (4) Date: Jul. 1, 2013

(87) PCT Pub. No.: WO2012/089850
PCT Pub. Date: Jul. 5, 2012

(65) Prior Publication Data
US 2013/0278147 A1 Oct. 24, 2013

(30) Foreign Application Priority Data

Dec. 31, 2010 (GB) .................................. 1022138.0

(51) Int. Cl.
*G09G 5/10* (2006.01)
*G02F 1/1335* (2006.01)
(Continued)

(52) U.S. Cl.
CPC ............ *G09G 5/10* (2013.01); *G02F 1/133602* (2013.01); *G09G 3/3406* (2013.01);
(Continued)

(58) Field of Classification Search
CPC ............. G01J 1/4204; G01J 1/32; G01J 1/10; G01J 3/513; G01J 60/144; G01J 60/145
USPC ........... 315/151, 152, 156; 345/102, 151, 207
See application file for complete search history.

(56) References Cited

U.S. PATENT DOCUMENTS

2003/0047736 A1 3/2003 Hayashi et al. ................. 257/79
(Continued)

FOREIGN PATENT DOCUMENTS

| CN | 1395230 A | 8/2005 |
|---|---|---|
| CN | 101180565 A | 3/2009 |
| EP | 2028640 | 2/2009 |

(Continued)

OTHER PUBLICATIONS

European Examination Report dated Apr. 22, 2014, corresponding to European patent application No. 12711580.6.
(Continued)

*Primary Examiner* — John Poos
(74) *Attorney, Agent, or Firm* — Renner, Otto, Boisselle & Sklar, LLP

(57) ABSTRACT

A display method and display device are described having at least one sensor for detecting a property of light such as the intensity, color and/or color point of light emitted from at least one display area of a display device into a viewing angle of the display device and to measure and isolate the contributions of ambient light. An advantage of the sensor system is that it can be used for real-time measurements, e.g. while the display device is in use, and off-line, e.g. when the normal display functionality is interrupted, with a high signal to noise ratio and simultaneously can isolate the contributions of the signals from the backlight of the display device and the signals from the ambient light.

27 Claims, 9 Drawing Sheets

(51) Int. Cl.
*G09G 3/34* (2006.01)
*G09G 5/02* (2006.01)

(52) U.S. Cl.
CPC ............ *G02F2201/58* (2013.01); *G09G 5/026* (2013.01); *G09G 2320/066* (2013.01); *G09G 2360/144* (2013.01); *G09G 2360/145* (2013.01); *G09G 2380/08* (2013.01)

(56) References Cited

U.S. PATENT DOCUMENTS

| | | | | |
|---|---|---|---|---|
| 2005/0184983 | A1 | 8/2005 | Brabander et al. | 345/204 |
| 2007/0268241 | A1* | 11/2007 | Nitta et al. | 345/102 |
| 2009/0066897 | A1 | 3/2009 | Katoh et al. | 349/116 |
| 2010/0253660 | A1 | 10/2010 | Hashimoto | |

FOREIGN PATENT DOCUMENTS

| | | |
|---|---|---|
| GB | 2466846 | 7/2010 |
| WO | 2010/081814 | 7/2010 |

OTHER PUBLICATIONS

International Search Report for corresponding International Application No. PCT/EP2012/050029 mailed Jun. 19, 2012.
GB Search Report for corresponding GB application.
European Examination Report dated Mar. 2, 2015, corresponding to European patent application No. 12711580.6.
European Examination Report dated Nov. 30, 2015, corresponding to European patent application No. 12711580.6.
Chinese Office Action issued Jun. 15, 2015 for corresponding Chinese Application No. 201280004457.9.

* cited by examiner

DISPLAY DEVICE AND MEANS TO MEASURE AND ISOLATE THE AMBIENT LIGHT

This application is a national phase of International Application No. PCT/EP2012/050029 filed Jan. 2, 2012 and published in the English language.

FIELD OF THE INVENTION

The invention related to a method and display device having at least one sensor for detecting a property such as the intensity, color uniformity and/or color point of light emitted from at least one display area of a device into a viewing angle of the display device and to measure and isolate the contributions of ambient light, The invention also relates to the use of such a display device.

BACKGROUND OF THE INVENTION

From a range of modern display devices, like liquid crystal display devices (LCD devices), crucial data is needed to be retrieved by the human eye. These modern display devices are more important than ever before for a large number of applications. For instance these can be medical imaging devices, displays in control rooms, professional broadcast monitors, defense and avionics displays etc. As a result high-quality imaging using display devices like liquid crystal display devices (LCD devices) is essential.

In the case of medical imaging, but not limited to, suitable display devices are typically provided with a sensor and a controller device coupled thereto. One type of sensor is coupled to a backlight device, for instance comprising light emitting diodes (LEDs), of the LCD device which has the objective of stabilizing the output of the backlight device, which inherently varies as a consequence of the use of LEDs therein. Another problem to overcome when diagnosing using a display device is that these medical displays can be used in environments, which have a relatively high ambient light level, depending on the exact application. This ambient light level directly impacts the perceived contrast of the display (because typically the display partially reflects impinging light), which again impacts the diagnostic performance. EP1274066B1 discloses a display device wherein the sensing is applied in front of the display, comprising a light guide, for instance a waveguide or fiber, to guide a portion of the light output to a sensor outside of the viewing angle of the display. Light originating from a display area comprising a plurality of pixels is introduced into the light guide, for instance into a continuous waveguide or at one end of the fiber. In addition, the portion of the display that is blocked for light transmission is limited. Particularly light rays traveling under a large angle to the axis of the light guide can be forced to exit the structure, while ambient light is obstructed from entering the light guide. By using this small acceptance angle, entering of that ambient in the photodiode sensor without a need for shielding is realized. However, it is desired to further improve such a sensor system, i.e. sensor and light guide. For instance by using one implementation shown in EP1274066, wherein an end of a fiber is parallel to the output surface of the display and the fiber is bent. This is however not a most practical implementation. WO2010/081814 discloses a display device comprising a sensor system with at least one sensor for detecting the intensity or color of light emitted from at least one display area of the display device into the viewing angle of the display device. The sensor system further comprises an at least partially transparent sensor and in another embodiment at least one optical coupling device including a light guide member and a incoupling member for guiding or directing, e.g. deflecting, reflecting, bending, scattering, diffracting, at least one part of the light emitted from the display area to the corresponding sensor, wherein the latter sensor is located outside or at least partially outside the viewing angle of the display device.

However in an environment with a certain level of ambient light (i.e. light not originating from the backlight of the display), the measured light emitted from the display area to the corresponding sensor will be a combination of the light emitted by the display and the ambient light falling on the sensor from the environment. This may dynamically change for instance due to shadows being cast on the display screen. It would thus be beneficial if measurements are performed using the described display and in addition to adapt the backlight of this display to the amount of measured ambient light in order to maintain perceived contrast within tolerable limits.

SUMMARY OF THE INVENTION

It is therefore an object of the present invention to provide an alternative method and display device having at least one sensor for detecting a property such as the intensity, color and/or chromaticity of light emitted from at least one display area of a device into a viewing angle of the display device and to measure and isolate the contributions of ambient light as well as a use of such a display device.

An advantage of the sensor system is that it can be used for real-time measurements, e.g. while the display is in use, and off-line, e.g. when the normal display functionality is interrupted, with a high signal to noise ratio and simultaneously can isolate the contributions of the signals from the backlight of the display and the signals from the ambient light.

According to a first aspect of the invention, a display device is provided that comprises at least one display area provided with a plurality of pixels. For each display area an at least partially transparent sensor for detecting a property of light emitted from the said display area into a viewing angle of the display device is present. The sensor is located in a front section of said display device in front of said display area.

Surprisingly good results have been obtained with at least partially transparent sensors located in front of the display area and within the viewing angle (i.e. in the light path originating from the display pixels, going to the eyes of the observer). An expected disturbance of the display image tends to be (almost) entirely absent. Due to the direct incoupling of the light into the sensor, proper light capturing by the sensor is achieved without a coupling member. Such a transparent sensor can for instance be suitably applied to an inner face of a cover member. Indeed, the transparent cover member may be used as a substrate in the manufacturing of the sensor. Particularly, an organic or inorganic substrate has sufficient thermal stability to withstand operating temperature of vapour deposition and the high vacuum conditions, which is a preferred way of deposition of the layers constituting the sensor. Flexible substrates such as flexible polymeric substrates can also be used. Specific examples of deposition techniques include chemical vapour deposition (CVD) and any type thereof for depositing inorganic semiconductors such as metal organic chemical vapour deposition (MOCVD) or thermal vapor deposition. In addition one can also apply low temperature deposition techniques such as printing and coating for depositing organic materials for instance. Another method, which can be used, is organic vapor phase deposition. When depositing organic materials, the temperatures at the substrate level are not much lower than any of the vapor deposition. Assembly is not excluded as a manufacturing technique. In addition, coating techniques can also be used on glass substrates, however for polymers one must keep in mind that the solvent can dissolve the substrate in some cases.

In a suitable embodiment hereof, the device further comprises at least partially transparent electrical conductors for conducting a measurement signal from said sensor within said viewing angle for transmission to a controller. Substantially transparent conductor materials such as a tin oxide, e.g. indium tin oxide (ITO) or a substantially transparent conductive polymer such as polymeric Poly(3,4-ethylenedioxythiophene)poly(styrenesulfonate), typically referred to as PEDOT:PSS, are well known partially transparent electrical conductors. Preferably, a thin oxide or transparent conductive oxide is used, for instance zinc oxide can also be used which is known to be a good transparent conductor. In one most suitable embodiment, the sensor is provided with transparent electrodes that are defined in one layer with the said conductors (also called a lateral configuration). This reduces the number of layers that inherently lead to additional absorption and to interfaces that might slightly disturb the display image.

In a preferred embodiment, the sensor comprises an organic photoconductive sensor. Such organic materials have been subject of advanced research over the past decades. Organic photoconductive sensors may be embodied as single layers, as bilayers and as general multilayer structures. They may be advantageously applied within the present display device. Particularly, the presence on the inner face of the cover member allows that the organic materials are present in a closed and controllable atmosphere, e.g. in a space between the cover member and the display, which will provide protection from any potential external damaging. A getter may for instance be present to reduce negative impact of humidity or oxygen. An example of a getter material is CaO. Furthermore, vacuum conditions or a predefined atmosphere (for instance pure nitrogen, an inert gas) may be applied in said space upon assembly of the cover member to the display, i.e. an encapsulation of the sensor.

A sensor comprising an organic photoconductive sensor suitably further comprises a first and a second electrode that advantageously are located adjacent to each other. The location adjacent to each other, preferably defined within one layer, allows a design with finger-shaped electrodes that are mutually interdigitated. Herewith, charges generated in the photoconductive sensor are suitably collected by the electrodes. Preferably the number of fingers per electrode is larger than 50, more preferably larger than 100, for instance in the range of 250-2000. However the present invention is not limited to this amount.

Furthermore an organic photoconductive sensor can be a mono layer, a bi-layer or in general a multiple (>2) layer structure. In one preferred type of photoconductive sensor is one wherein the organic photoconductive sensor is a bilayer structure with a exciton generation layer and a charge transport layer, said charge transport layer being in contact with a first and a second electrode. Such a bilayer structure is for instance known from Applied Phys Letters 93, "Lateral organic bilayer heterojunction photoconductors" by John C. Ho, Alexi Arango and Vladimir Bulovic. The sensor described by J. C. Ho et al relates to a non-transparent sensor as it refers to gold electrodes, which will absorb the impinging light entirely. The bilayer comprises an EGL (PTCBI) or Exciton Generation Layer and a HTL (TPD) or Hole Transport Layer (HTL) (in contact with the electrodes).

Alternatively, sensors comprising composite materials could be constructed. With composite materials nano/micro particles are proposed, either organic or inorganic dissolved in the organic layers, or an organic layer consisting of a combination of different organic materials (dopants). Since the organic photosensitive particles often exhibit a strongly wavelength sensitive absorption coefficient, this configuration can result in a less colored transmission spectrum when suitable materials are selected and suitably applied, or can be used to improve the detection over the whole visible spectrum, or can improve the detection of a specific wavelength region Alternatively, instead of using organic layers to generate charges and guide them to the electrodes, hybrid structures using a mix of organic and inorganic materials can be used. A bilayer device that uses a quantum-dot exciton generation layer and an organic charge transport layer can be used. For instance colloidal Cadmium Selende quantum dots and an organic charge transport layer comprising of Spiro-TPD.

The display defined in the at least one display area of the display device may be of conventional technology, such as an liquid crystal device (LCD) with a backlight, for instance based on light emitting diodes (LEDs), or an electroluminescent device such as an organic light emitting (OLED) display. The display device suitably further comprises an electronic driving system and a controller receiving optical measurement signals generated in the at least one sensor and controlling the electronic driving system on the basis of the received optical measurement signals.

According to other embodiments of the invention, a display device is provided that comprises at least one display area with a plurality of pixels. For each display area, at least one sensor and optionally an at least partially transparent optical coupling device are provided. The addition of an extra component is less advantageous but is included within the scope of the present invention. The at least one sensor is designed for detecting a property of light emitted from the said display area into a viewing angle of the display device. The sensor is located outside or at least partially outside the viewing angle. The at least partially transparent optical coupling device is located in a front section of said display device. It comprises a light guide member for guiding at least one part of the light emitted from the said display area to the corresponding sensor. The coupling device further comprises an incoupling member for coupling the light into the light guide member.

It is an advantage of the present invention to detect a property such as the brightness or the chromaticity of light emitted by at least one display area of a display device into the viewing angle of said display device without notably degrading the display device's image quality. The use of the incoupling member solves the apparent contradiction of a waveguide parallel to the front surface that does not disturb a display image, and a signal-to-noise ratio sufficiently high for allowing real-time measurements. An additional advantage is that any scattering eventually occurring at or in the incoupling member is limited to a small number of locations over the front surface of the display image. However, when using waveguides a moiré pattern can be observed at the edge of the waveguides, which can be considered to be a high risk, to lower this risk the described embodiments using organic photoconductive sensors can be applied Preferably, the light guide member is running in a plane, which is parallel to a front surface of the display device. The incoupling member is suitably an incoupling member for laterally coupling the light into the light guide member of the coupling device. The result is a substantially planar incoupling member. This has the advantage of minimum disturbance of displayed images. Furthermore, the coupling device may be embedded in a layer or plate. It may be assembled to a cover member, i.e. front glass plate, of the display after its manufacturing, for instance by insert or transfer moulding. Alternatively, the cover member is used as a substrate for definition of the coupling device.

In one implementation, a plurality of light guide members is arranged as individual light guide members or part of a light guide member bundle. It is suitable that the light guide member is provided with a circular or rectangular cross-sectional shape when viewed perpendicular to the global propagation direction of light in the light guide member. A light guide with such a cross-section may be made adequately, and moreover limits scattering of radiation. The cover member is typically a transparent substrate, for instance of glass or polymer material.

In any of the above embodiments the sensor or the sensors of the sensor system is/are located at a front edge of the display device.

The incoupling member of this embodiment may be present on top of the light guide member or effectively inside the light guide member. One example of such location inside the light guide is that the incoupling member and the light guide member have a co-planar ground plane. The incoupling member may then extend above the light guide member or remain below a top face of the light guide member or be coplanar with such top face. Furthermore, the incoupling member may have an interface with the light guide member or may be integral with such light guide member In one particular embodiment, the or each incoupling member is cone-shaped. The incoupling member herein has a tip and a ground plane. The ground plane preferably has circular or oval shape. The tip is preferably facing towards the display area.

The incoupling member may be formed as a laterally prominent incoupling member. Most preferably, it is delimited by two laterally coaxially aligned cones, said cones having a mutual apex and different apex angles. The difference between the apex angles $\Delta\alpha=\alpha 1-\alpha 2$ is smaller than the double value of the critical angle ($\theta c$) for total internal reflection (TIR) $\Delta\alpha<2\theta c$. Especially, the or each incoupling member fades seamlessly to the guide member of the coupling device. The or each incoupling member and the or each guide member are suitably formed integrally.

In an alternative embodiment, the or each incoupling member is a diffraction grating. The diffraction grating allows that radiation of a limited set of wavelengths is transmitted through the light guide member. Different wavelengths (e.g. different colours) may be incoupled with gratings having mutually different grating periods. The range of wavelengths is preferably chosen so as to represent the intensity of the light most adequately.

In a further embodiment hereof, both the cone-shaped incoupling member and diffraction grating are present as incoupling members. These two different incoupling members may be coupled to one common light guide member or to separate light guide members, one for each, and typically leading to different sensors.

By using a first and a second incoupling members of different type on one common light guide member, light extraction, at least of certain wavelengths, may be increased, thus further enhancing the signal to noise ratio. Additionally, because of the different operation of the incoupling members, the sensor may detect more specific variations.

By using a first and a second incoupling member of different type in combination with a first and a second light guide member respectively, the different type of incoupling members may be applied for different type of measurements. For instance, one type, such as the cone-shaped incoupling member, may be applied for luminance measurements, whereas the diffraction grating or the phosphor discussed below may be applied for color measurements. Alternatively, one type, such as the cone-shaped incoupling member, may be used for a relative measurement, whereas an other type, such as the diffraction grating, is used for an absolute measurement. In this embodiment, the one incoupling member (plus light guide member and sensor) may be coupled to a larger set of pixels than the other one. One is for instance coupled to a display area comprising a set of pixels, the other one is coupled to a group of display areas.

In a further embodiment, the incoupling member comprises a transformer for transforming a wavelength of light emitted from the display area into a sensing wavelength. The transformer is for instance based on a phosphor. Such phosphor is suitably locally applied on top of the light guiding member. The phosphor may alternatively be incorporated into a material of the light guiding member. It could furthermore be applied on top of another incoupling member (e.g. on top of or in a diffraction grating or a cone-shaped member or another incoupling member).

The sensing wavelength is suitably a wavelength in the infrared range. This range has the advantage the light of the sensing wavelength is not visible anymore. Incoupling into and transport through the light guide member is thus not visible. In other words, any scattering of light is made invisible, and therewith disturbance of the emitted image of the display is prevented. Such scattering typically occurs simultaneously with the transformation of the wavelength, i.e. upon reemission of the light from the phosphor. The sensing wavelength is most suitably a wavelength in the near infrared range, for instance between 0.7 and 1.0 micrometers, and particularly between 0.75 and 0.9 micrometers. Such a wavelength can be suitably detected with a commercially available photodetectors, for instance based on silicon.

A suitable phosphor for such transformation is for instance a Manganese Activated Zinc Sulphide Phosphor. Preferably, the phosphor is dissolved in a waveguide material, which is then spin coated on top of the substrate. The substrate is typically a glass substrate, for example BK7 glass with a refractive index of 1.51. Using lithography, the parts are removed from which are undesired. Preferably, a rectangle is constructed which corresponds to the photosensitive area, in addition the remainder of the waveguide, used to transport the generated optical signal towards the edges, is created in a second iteration of this lithographic process. Another layer can be spin coated (without the dissolved phosphors) on the substrate, and the undesired parts are removed again using lithography. Waveguide materials from Rohm&Haas can be used or PMMA.

Such a phosphor may emit the desired wavelength region, where the manganese concentration is greater than 2%. Also other rare earth doped zinc sulfide phosphors can be used for infrared (IR) emission. Examples are ZnS:ErF3 and ZnS: NdF3 thin film phosphors, such as disclosed in J. Appl. Phys. 94 (2003), 3147, which is incorporated herein by reference. Another example is ZnS:TmxAgy, with x between 100 and 1000 ppm and y between 10 and 100 ppm, as disclosed in U.S. Pat. No. 4,499,005.

The display device suitably further comprises an electronic driving system and a controller receiving optical measurement signals generated in the at least one sensor and controlling the electronic driving system on the basis of the received optical measurement signals.

The display defined in the at least one display area of the display device may be of conventional technology, such as an liquid crystal device (LCD) with a backlight, for instance based on light emitting diodes (LEDs), or an electroluminescent device such as an organic light emitting (OLED) diodes.

Instead of being an alternative to the before mentioned transparent sensor solution, the present sensor solution of coupling member and sensor may be applied in addition to such sensor solution. The combination enhances sensing solutions and the different type of sensor solutions have each their benefits. The one sensor solution may herein for instance be coupled to a larger set of pixels than another sensor solution.

While the foregoing description refers to the presence of at least one display area with a corresponding sensor solution, the number of display areas with a sensor is preferably larger than one, for instance two, four, eight or any plurality. It is preferable that each display area of the display is provided with a sensor solution, but that is not essential. For instance, merely one display area within a group of display areas could be provided with a sensor solution.

In a further aspect according to the invention, use of the said display devices for sensing a light property while displaying an image is provided.

Most suitably, the real-time detection is carried out for the signal generated by the sensor according to the preferred embodiment of this invention, this signal is generated according to the sensors' physical characteristics as a consequence of the light emitted by the display, according to its light emission characteristics for any displayed pattern.

The detection of luminance and color (chromaticity) aspects may be carried out in a calibration mode, e.g. when the display is not in a display mode.

However, it is not excluded that luminance and chromaticity detection may also be carried out real-time, in the display mode. In some embodiments, It can be suitable to do the measurements relative to a reference value.

In another preferred embodiment, e.g. suitable for performing real-time measurements, the sensor system can comprise an optical electronic or mechanical filter. For example the filter can comprise optical differential filters such as two sensors one of which is sensitive to a polarization of received light and the other is insensitive to the impinging light's polarization. To obtain this polarization sensitivity, at least one sensor can be rubbed and at least one sensor can be non-rubbed, whereby the non-rubbed sensor is polarization insensitive. By rubbing the sensor (a method to do so is described by J. M. Geary et al, *The mechanism of polymer alignment of liquid-crystal materials*, J. Appl. Phys. 62, 10 (1987) which is included herein by reference) and aligning the molecules of the layer only linearly polarized light in one direction is absorbed by the sensor. The other, orthogonal, component of the light measured by the said sensor is not or only partially absorbed. The light emitted by most LCD's however is linearly polarized in one direction, whereas the ambient light is unpolarized. As a result, when using sensor systems comprising two sensors, one of which is sensitive to a polarization of received light and the other is able to detect all light polarizations of the received light, such as at least one rubbed and one non-rubbed sensor, at least one sensor only reacts to the polarization corresponding to the polarization emitted by the display device and a part of the ambient light with the same polarization whereas with the other sensor, both the ambient light and light emitted by the display device are detected. The measured light, measured by the at least one non-rubbed sensor, is the total of the ambient light and light emitted by the display device at the location where the sensor measures, even if polarized, while the measured light, measured by the at least one rubbed sensor, is the total of 50% of the ambient light and the light emitted from display device at the location where the sensor measures, As the two sensors are located close to each other, the ambient light remains approximately constant, and we can use the display to depict the same content This can mathematically be expressed in two linear equations with two unknowns, which is easily solved. As a result, the amounts of the respective contributions of the ambient light and display device can be derived and isolated.

In addition, in another embodiment, continuous recording of the outputs of at least one rubbed and one non-rubbed sensor can result in digital water marking, e.g. after capturing and recording all the signals measured by all the sensors of the sensor system in a session (e.g. at the time of a diagnosis), it could be possible to re-create the same conditions which existed when an image was displayed in the session (e.g. used to perform the diagnosis), at a later date. However, the spectra of the light emitted by the display and the ambient light differ in most instances. Therefore, the obtained ambient light and display light should be preferably matched to these spectra.

In yet another embodiment, the contribution of the ambient light to the output signal of the sensor ambient light is measured and isolated by using an alternative type of filter, e.g. an electronic filter such as a filter on a temporal modulation of the backlight. Display devices are typically Pulse Width Modulated (PMW) driven, by driving the backlight of the display devices in a blinking mode, e.g. by switching the backlight on and off in short pulses over time. When measuring the light properties using the on and off state of the blinking backlight of the display device, the light originating from only the display device, without the ambient light, can be derived. As a result this temporal variation of the display light can be used to discriminate between display light and ambient light. In a preferred embodiment a partially transparent sensor is preferred without a blocking or attenuating effect at the frequency of the blinking backlight.

In a further embodiment, a mechanical filter can be used that filters out the ambient light. For example the partially transparent sensor can be one that possesses touch functionality, for instance technology allowing a touch screen. When such a sensor is touched with a finger, all the external light is blocked by a shadowing effect, and thus all the ambient light is blocked locally when touching the region of interest. The display can be designed with the required intelligence, such that it is aware of the touching from the touched sensor. The display device can then measure the light properties in a touched state where all or a significant amount of the external light is blocked. The measurement is then repeated in an untouched state. The derived difference between the two measurements provides the amount of ambient light.

Moreover the finger touching the sensor can have a reflection as well, which can influence the amount of light sensed by the sensor. As a result, the display device can be calibrated by first carrying out a test to determine the influence of the reflection of a finger on the amount of measured light coming from the display without ambient light.

Moreover, the use of a black absorbing cover as a light filter can be used for calibration and to isolate or attenuate the ambient light contribution. For this method two luminance measurements are performed. The first measurement(s) include measuring the full light contribution, which is the emitted light from the display and the ambient light conditions. During a second measurement, the sensor measures the emitted display light with all ambient light excluded. The latter step can be accomplished by using a black absorbing cover over the display, for example. Both these measurements are needed when one desires to quantify the ambient light. However, if one merely wants to measure the light emitted by the display, without the ambient light contribution, it is sufficient to cover the display to exclude ambient light influences and then measure.

One needs to take into consideration here as well that the light emitted by the display can have a spectrum that significantly differs from the ambient light perceived spectrum, hence the obtained result needs to be matched to a device that includes a V(λ) filter, which allows correctly measuring ambient light of any type, if it is beneficial to quantify the ambient light. However, this matching is not required if it is sufficient to remove the contribution of the ambient light to the measured signal (in case this is ambient light+light emitted by the display area).

Each radiant quantity has a corresponding luminous i.e. photometric quantity which considers the visual perception of the human eye. A V(λ) curve describes the spectral response function of the human eye in the wavelength range from 380 nm to 780 nm and is used to establish the relation between the radiometric quantity that is a function of wavelength λ, and the corresponding photometric quantity. The V(λ) curve is depicted in FIG. 10. As an example, the photometric value luminous flux can be obtained by integrating radiant power φe (λ) as follows:

$$\phi_v = K_m \int_{380\,nm}^{780\,nm} \phi_e(\lambda) \cdot V(\lambda) d\lambda$$

The unit of luminous flux φv is lumen [lm], the unit of φe is Watt [W] and for V(λ) is [1/nm], in addition the factor Km is 683 lm/W and the latter establishes the relationship between the (physical) radiometric unit watt and the (physiological) photometric unit lumen. All other photometric quantities are also obtained from the integral of their corresponding radiometric quantities weighted with the V(λ) curve. The table below lists important radiometric and photometric quantities:

|  |  | Unit |
| --- | --- | --- |
| Radiometery |  |  |
| Radiant power | φe | W |
| Radiant intensity | Ie | W/sr |
| Irradiance | Ee | W/m² |
| Radiance | Le | W/m² sr |
| Photometry |  |  |
| Luminous flux | φv | Lm |
| Luminous intensity | $I_v$ | Lm/sr = cd |
| Illuminance | $E_v$ | Lm/m² = lx |
| Luminance | $L_v$ | cd/m² |

It is clear from the explanation above, that measurements of luminance and illuminance require a spectral response that matches the V(λ) curve as closely as possible. In general, a sensor that is sensitive to the entire visible spectrum doesn't have a spectral sensitivity over the visible spectrum that matches the V(λ) curve. Therefore, an additional spectral filter is needed to obtain the correct spectral response.

As the display's spectrum is typically constant over time to a very high degree, the semitransparent sensor can be calibrated upfront, during production using an external V(λ) sensor. This is not a problem over the display's lifetime because the spectrum of our display (e.g. it's white point) does not change. Therefore, when the contribution of the ambient light is removed from the measurements.

However, the ambient light conditions are not known upfront, as the room in which the display will be used can have profoundly different spectra. For instance, think of everyday practical situations where light sources, such as LED lamps, halogen lamps, natural light, TL lamps. Therefore, in a suitable embodiment we can add an ambient light sensor which has a spectral sensitivity that matches the V (λ) curve. This sensor can be for instance integrated into the display's bezel, and used to calibrate the sensor according to the embodiments of the present invention. The ambient light contribution in the measurements can hence be quantified instead of being merely removed from the measurements. Of course, to merely remove the contribution of the ambient light, an additional sensor that ensures correct calibration is not required. To quantify the contribution of the ambient light, we need to take the physics of the sensor into consideration, such as non-linearity of the sensor in case they would occur.

As a result, for an appropriate real-time sensing while display of images in ongoing, further processing on sensed values is suitably carried out. Therein, an image displayed in a display area is used for treatment of the corresponding sensed value or sensed values, as well as the sensor's properties. Aspects of the image that are taken into account, are particularly its light properties, and more preferably light properties emitted by the individual pixels or an average thereof. Light properties of light emitted by individual pixels include their emission spectrum at every angle.

An algorithm may be used to calculate the expected response of the sensor, based on digital driving levels provided to the display and the physical behavior of the sensor (this includes its spectral sensitivity over angle, its non-linearity and so on). When comparing the result of this algorithm to the actually measured light of a pixel or a group of pixels, it is possible to improve the display's performance by implementing a precorrection on the display's driving levels to obtain the desired light output. This precorrection may be an additional precorrection which can be added onto a precorrection that for example corrects the driving of the display such that a uniform light output over the display's active area is obtained.

In one embodiment, the difference between the sensing result and the theoretically calculated value is compared by a controller to a lower and/or an upper threshold value taking into account the reference If the result is outside the accepted range of values, it is to be reviewed or corrected. One possibility for review is that one or more subsequent sensing results for the display area are calculated and compared by the controller. If more than a critical number of sensing values for one display area are outside the accepted range, then the setting for the display area is to be corrected so as to bring it within the accepted range. A critical number is for instance 2 out of 10. E.g. if 3 to 10 of sensing values are outside the accepted range, the controller takes action. Else, if the number of sensing values outside the accepted range is above a monitoring value but not higher than the critical value, then the controller may decide to continue monitoring.

In order to balance processing effort, the controller may decide not to review all sensing results continuously, but to restrict the number of reviews to infrequent reviews with a specific time interval in between. Furthermore, this comparison process may be scheduled with a relatively low priority, such that it is only carried out when the processor is idle.

In another embodiment, such sensing result is stored in a memory. At the end of a monitoring period, such set of sensing results may be evaluated. One suitable evaluation is to find out whether the sensed values of the differences in light are systematically above or below the threshold value that, according to the settings specified by the driving of the display, should be emitted. If such systematic difference exists, the driving of the display may be adapted accordingly. In order to increase the robustness of the set of sensing results, certain sensing results may be left out of the set, such as for instance an upper and a lower value. Additionally, it may be that values corresponding to a certain display setting are looked at. For instance, sensing values corresponding to a high (RGB) driving levels are looked at only. This may be suitable to verify if the display behaves at high (RGB) driving levels similar to its behaviour at other settings, for instance low (RGB) driving levels. Alternatively, the sensed values of certain (RGB) driving level settings may be evaluated as these values are most reliable for reviewing driving level settings. Instead of high and low values, one may think of light measurements when emitting a predominantly green image versus the light measurements when emitting a predominantly yellow image. Additional calculations can be based on said set of sensed values. For instance, instead of merely determining a difference between sensed value and theoretically calculated value of the light output which is the originally calibrated value, the derivative may be reviewed. This can then be used to see whether the difference increases or decreases. Again, the timescale of determining such derivative may be smaller or larger, preferably larger, than that of the absolute difference. It is not excluded that average values are used for determining the derivative over time.

In another use, sets of sensed values, at a uniform driving of the display (or when applying another precorrection dedicated to achieve a uniform luminance output) for different display areas are compared to each other. In this manner, homogeneity of the display emittance (e.g. luminance) can be calculated.

It will be understood by the skilled reader, that use is made of storage of displays theoretically calculated values and sensed values for the said processing and calculations. An efficient storage protocol may be further implemented by the skilled person. In the embodiment the display is used in a room with ambient light and the sensed value is suitably compared to a reference value for calibration purposes. The calibration will be typically carried out per display area. In the case of using a display with a backlight, the calibration typically involves switching the backlight on and off to determine potential ambient light influences that might be measured during normal use of the display, for a display area and suitably one or more surrounding display areas. The difference between these measured values corresponds to the influence of the ambient light. This value needs to be determined because otherwise the calculated ideal value and the measured value will never match when the display is put in an environment that is not pitch black. In case of using a display without backlight, the calibration typically involves switching the display off, within a display area and suitably surrounding display areas. The calibration is for instance carried out for a first time upon start up of the display. It may subsequently be repeated for display areas. Moments for such calibration during real-time use, which do not disturb a viewer, include for instance short transition periods between a first block and a second block of images. In case of consumer displays, such transition period is for instance an announcement of a new and regular program, such as the daily news. In case of professional displays, such as displays for medical use, such transition periods are for instance periods between reviewing a first medical image (X-ray, MRI and the like) and a second medical image. The controller will know or may determine such transition period.

While the above method has been expressed in the claims as a use of the above mentioned sensor solutions, it is to be understood that the method is also applicable to any other sensor to be used with other display types. It is more generally a method of using a matrix of sensors in combination with a display. In the preferred embodiment, the matrix of sensors is designed such that it is permanently integrated into the display's design. Therefore, a matrix of transparent organic photoconductive sensors is used preferably, suitably designed to preserve the display's visual quality to the highest possible degree.

The goal can be either to assess the luminance or color uniformity of the spatial light emission of a display, based on at least two zones.

Providing a sensing result by:

Comparing the sensor value which is actually measured in the area near to the ideally measured value which should have been measured by the sensor for a specified display area with the applied display settings for said display area corresponding to the moment in time on which the sensor determination is based. This can either be based on a mathematical algorithm or on an additional calibration step, depending on whether a real-time measurements or offline measurements are made using uniform patches, and Evaluating the sensing result and/or evaluating a set of sensing results for defining a display evaluation parameter;

If the display evaluation parameter is outside an accepted range, modify the display settings, or notify the user the display is out of the desired operating range, and/or continue monitoring said display area.

The average display settings as used herein are more preferably the ideally emitted luminance as discussed above.

These and other aspects of the invention will be apparent from and elucidated with reference to the embodiments described hereinafter.

DESCRIPTION OF THE ILLUSTRATIVE EMBODIMENTS

Figure 1:
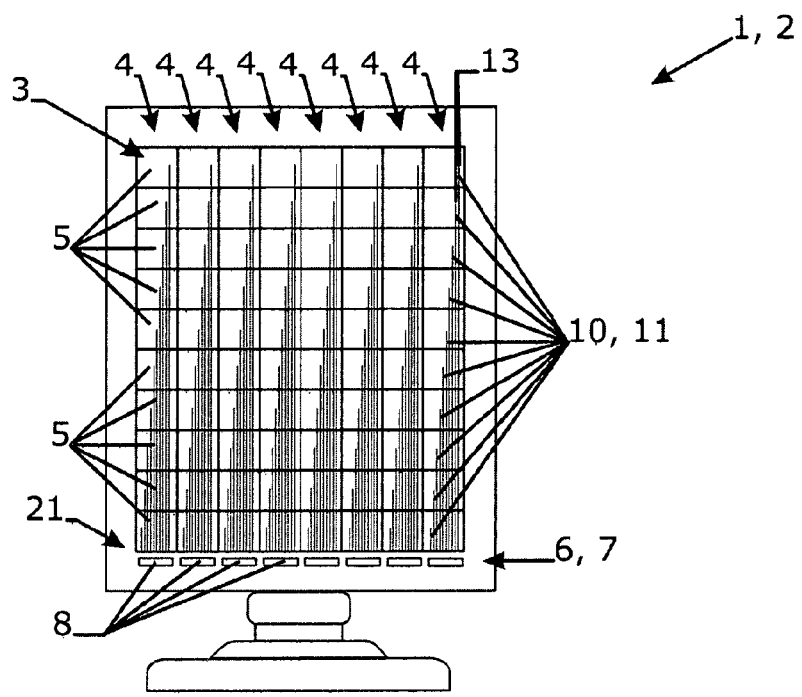
FIG. 1 is a schematic illustration of a display device with a sensor system according to a first embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

It is furthermore observed that the term "at least partially transparent" as used throughout the present application refers to an object that may be partially transparent for all wavelengths, fully transparent for all wavelengths, fully transparent for a range of wavelengths and partially transparent for the remaining wavelengths. Typically, it refers to optical transparency, e.g. transparency for visible light. Partially transparent is herein understood as the property that the intensity of an image shown through the partially transparent member is reduced due to the said partially transparent member or its color is altered. Partially transparent refers particularly to a reduction of impinging light intensity of at most 40%, at every wavelength of the visible spectrum, more preferably at most 25%, more preferably at most 10%, or even at most 5%. Typically the sensor design is chosen so as to be substantially transparent, i.e. with a reduction of impinging light intensity of at most 20% for every visible wavelength.

The term 'rubbed sensor' is used herein for reference to any at least partially transparent sensor comprising materials built of molecules which are aligned unidirectional. Typically, such a structure is provided by rubbing or buffing a very thin film, for instance by using a cloth. The direction of the polymer material alignment is then defined by the direction of rubbing. The rubbed sensor as a result of the alignment only can detect linearly polarized light in one direction. It is obvious for a person skilled in the art that there are other ways to orient molecules, such to achieve a polarization sensitive material.

The term 'light guide' is used herein for reference to any structure that may guide light in a predefined direction. One preferred embodiment hereof is a waveguide, e.g. a light guide with a structure optimized for guiding light. Typically, such a structure is provided with surfaces that adequately reflect the light without substantial diffraction and/or scattering. Such surfaces may include angles of substantially 90 to 180 degrees with respect to each other. Another embodiment is for instance an optical fiber.

Moreover, the term 'display' is used herein for reference to the functional display. In case of a liquid crystal display, as an example, this is the layer stack provided with active matrix or passive matrix addressing. The functional display is subdivided in display areas. An image may be displayed in one or more of the display areas. The term 'display device' is used herein to refer to the complete apparatus, including sensors, light guide members and incoupling members.

Suitably, the display device further comprises a controller, driving system and any other electronic circuitry needed for appropriate operation of the display device.

FIG. 1 shows a display device 1 formed as a liquid crystal display device (LCD device) 2. Alternatively the display device is formed as a plasma display devices or any other kind of display device emitting light. The display's active area 3 of the display device 1 is divided into a number of groups 4 of display areas 5, wherein each display area 5 comprises a plurality of pixels. The display device 3 of this example comprises eight groups 4 of display areas 5; each group 4 comprises in this example ten display areas 5. Each of the display areas 5 is adapted for emitting light into a viewing angle of the display device to display an image to a viewer in front of the display device 1.

Figure 2:
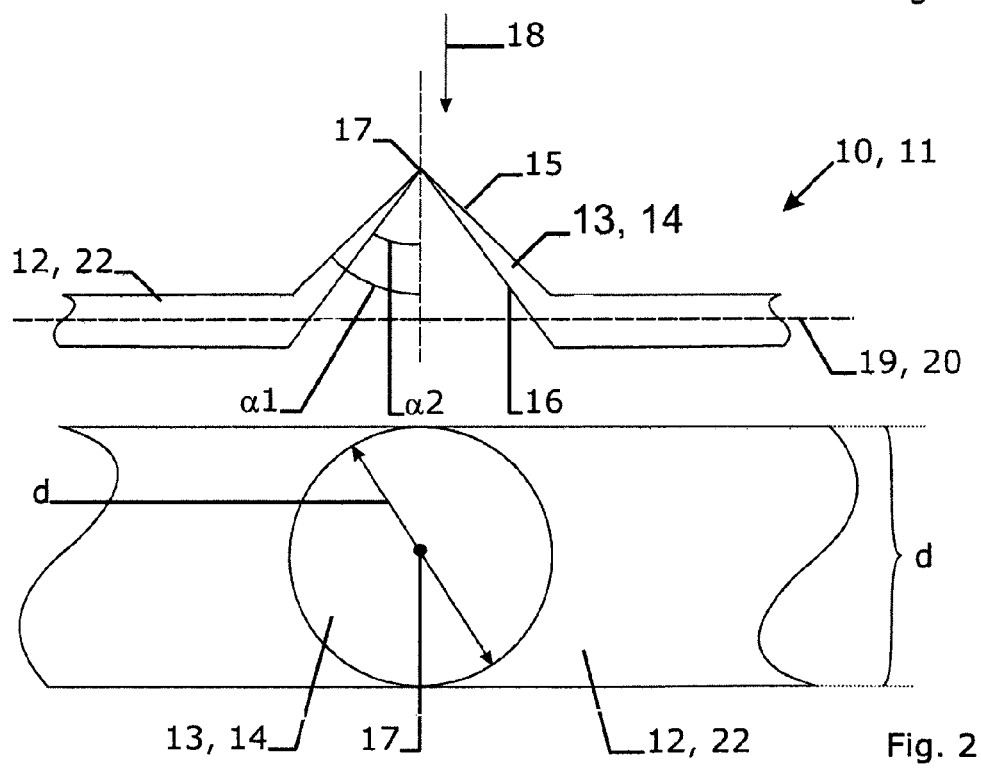
FIG. 2 shows the coupling device of the sensor system illustrated in FIG. 1.
Figure 3:
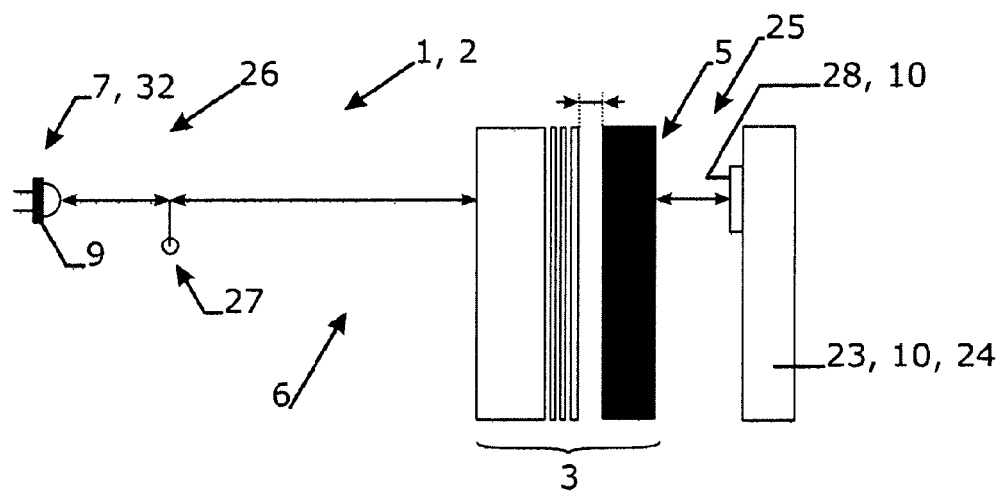
FIG. 3 shows a vertical sectional of a sensor system for use in the display device according to a third embodiment of the invention.
Figure 4:
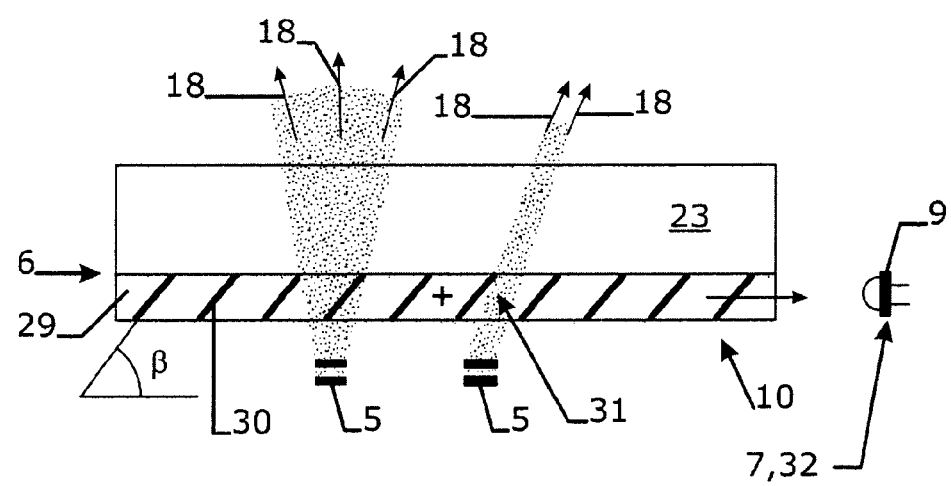
FIG. 4 shows a horizontal sectional view of a display device with a sensor system according to a fourth embodiment of the invention.
Figure 5:
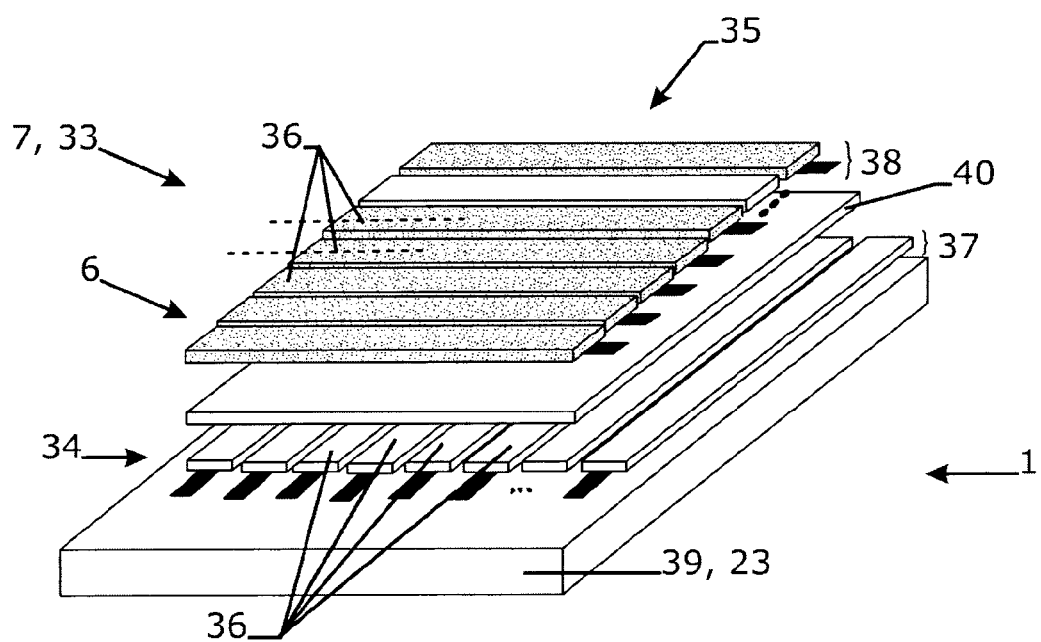
FIG. 5 shows a side view of a display device with a sensor system according to a second embodiment of the invention.

FIG. 1 further shows a sensor system 6 with a sensor array 7 comprising, e.g. eight groups 8 of sensors, which corresponds to the embodiment where the actual sensing is made outside the visual are of the display, and hence the light needs to be guided towards the edge of the display. This embodiment thus corresponds to a waveguide solution and not to the preferred organic photoconductive sensor embodiment, where the light is captured on top of (part of) the display area 5, and the generated electronic signal is guided towards the edge. In addition, in a preferred embodiment where organic photoconductive sensors are used to detect light, the actual sensor is created directly in front of the (part of) the sub area that needs to be sensed, and the consequentially generated electronic signal is guided towards the edge of the display, using semitransparent conductors Each of said groups 8 comprises, e.g. ten sensors (individual sensors 9 are shown in FIGS. 3, 4 and 5) and corresponds to one of the groups 4 of display areas 5. Each of the sensors 9 corresponds to one corresponding display area 5. In a specific embodiment the sensor system 6 further comprises coupling devices 10 for a display area 5 with the corresponding sensors 9. Each coupling device 10 comprises a light guide member 12 and an incoupling member 13 for coupling the light into the light guide member 12, as shown in FIG. 2. A specific incoupling member 13 shown in FIG. 2 is cone-shaped, with a tip and a ground plane. It is to be understood that the tip of the incoupling member 13 is facing the display area 5. Light emitted from the display area 5 and arriving at the incoupling member 13, is then refracted at the surface of the incoupling member 13. The incoupling member 13 is formed, in one embodiment, as a laterally prominent incoupling member 14, which is delimited by two laterally coaxially aligned cones 15, 16, said cones 15, 16 having a mutual apex 17 and different apex angles α1, α2. The diameter d of the cones 15, 16 delimiting the incoupling member 13 can for instance be equal or almost equal to the width of the light guide member 12. Said light was originally emitted (arrow 18) from the display area 5 into the viewing angle of the display device 1, note that only light emitted in perpendicular direction is depicted, while a display typically emits in a broader opening angle. The direction of this originally emitted light is perpendicular to the alignment of a longitudinal axis 19 of the light guide member 12. All light guide members 12 run parallel in a common plane 20 to the sensor array 7 at one edge 21 of the display device 1. Said edge 21 and the sensor array 7 are outside the viewing angle of the display device 1.

Alternatively, use may be made of a diffraction grating as an incoupling member 13. Herein, the grating is provided with a spacing, also known as the distance between the laterally prominent parts. The spacing is in the order of the wavelength of the coupled light, particularly between 500 nm and 2 μm. In a further embodiment, a phosphor is used. The size of the phosphor could be smaller than the wavelength of the light to detect.

The light guide members 12 alternatively can be connected to one single sensor 9. All individual display areas 5 can be detected by a time sequential detection mode e.g. by sequentially displaying a patch to be measured on the display areas 5.

The light guide members 12 are for instance formed as transparent or almost transparent optical fibres 22 (or microscopic light conductors) absorbing just a small part of the light emitted by the specific display areas 5 of the display device 1. The optical fibres 22 should be so small that a viewer does not notice them but large enough to carry a measurable amount of light. The light reduction due to the light guide members and the incoupling structures for instance is about 5% for any display area 5. More generally, optical waveguides may be applied instead of optical fibres, as discussed hereinafter.

Most of the display devices 1 are constructed with a front transparent plate such as a glass plate 23 serving as a transparent medium 24 in a front section 25 of the display device 1. Other display devices 1 can be made rugged with other transparent media 24 in the front section 25. Suitably, the light guide member 12 is formed as a layer onto a transparent substrate such as glass. A material suitable for forming the light guide member 12 is for instance PMMA (polymethylmethacrylate). Another suitable material is for instance commercially available from Rohm&Haas under the tradename Lightlink™, with product numbers XP-5202A Waveguide Clad and XP-6701A Waveguide Core. Suitably, a waveguide has a thickness in the order of 2-10 micrometer and a width in the order of micrometers to millimeters or even centimeters. Typically, the waveguide comprises a core layer that is defined between one or more cladding layers. The core layer is for instance sandwiched between a first and a second cladding layer. The core layer is effectively carrying the light to the sensors. The interfaces between the core layer and the cladding layers define surfaces of the waveguide at which reflection takes place so as to guide the light in the desired direction. The incoupling member 13 is suitably defined so as to redirect light into the core layer of the waveguide.

Alternatively, parallel coupling devices 10 formed as fibres 22 with a higher refractive index are buried into the medium 24, especially the front glass plate 23. Above each area 5 the coupling device 10 is constructed on a predefined guide member 12 so light from that area 5 can be transported to the edge 21 of the display device. At the edge 21 the sensor array 7 captures light of each display area 5 on the display device 1. This array 7 would of course require the same pitch as the fibres 22 in the plane 20 if the fibres run straight to the edge, without being tightened or bent. While fibres are mentioned herein as an example, another light guide member such as a waveguide, could be applied alternatively.

In FIG. 1 the coupling devices 10 are displayed with different lengths. In reality, full length coupling devices 10 may be present. The incoupling member 13 is therein present at the destination area 5 for coupling in the light (originally emitted from the corresponding display area 5 into the viewing angle of the display device 1) into the light guide member 12 of the coupling device 10. The light is afterwards coupled from an end section of the light guide member 12 into the corresponding sensor 9 of the sensor array at the edge 21 of the display device 1. The sensors 9 preferably only measures light coming from the coupling devices 10. In addition, the difference between a property of light in the coupling device 10 and that in the surrounding front glass plate 23 is measured. This combination of measuring methods leads to the highest accuracy. The property can be intensity or colour for example.

A human observer is unable to distinguish the brightness or chromaticity of light with a specific wavelength impinging on his retina. Instead, he possesses three distinct types of photoreceptors, sensitive to three distinct wavelength bands that define his chromatic response. This chromatic response can be expressed mathematically by color matching functions. Consequentially, three color matching functions, and have been defined by the CIE in 1931. They can be considered physically as three independent spectral sensitivity curves of three independent optical detectors positioned at our retinas. These color matching functions can be used to determine the CIE1931 XYZ tristimulus values, using the following formulae:

$$X=\int_0^\infty I(\lambda)\bar{x}(\lambda)d\lambda$$

$$Y=\int_0^\infty I(\lambda)\bar{y}(\lambda)d\lambda$$

$$Z=\int_0^\infty I(\lambda)\bar{z}(\lambda)d\lambda$$

Where $I(\lambda)$ is the spectral power distribution of the captured light. The luminance corresponds to the Y component of the CIE XYZ tristimulus values. Since a sensor, according to embodiments of the present invention, has a characteristic spectral sensitivity curve that differs from the three color matching functions depicted above, it cannot be used as such to obtain any of the three tristimulus values. However, the sensor according to preferred embodiment of the present invention is sensitive according to the absorption curve of the exciton generation layer, which can be selected such that it is sensitive to the entire visible spectrum, or at least to the spectral power distribution of the three primaries of a typical display, which allows obtaining the XYZ values after calibration for any specific type of spectral light distribution emitted by our display. Displays are typically either monochrome or color displays. In the case of monochrome (e.g. grayscale) displays, they only have a single primary (e.g. white), and hence emit light with a single spectral power distribution. Color displays have typically three primaries—red (R), green (G) and blue (B)—which have three distinct spectral power distributions. A calibration step preferably is applied to match the XYZ tristimulus values corresponding to the spectral power distributions of the display's primaries to the measurements made by the sensor according to embodiments of the present invention. In this calibration step, the basic idea is to match the XYZ tristimulus values of the specific spectral power distribution of the primaries to the values measured by the sensor, by capturing them both with the sensor and an external reference sensor. Since the sensor according to embodiments of the present invention is non-linear, and the spectral power distribution associated with the primary may alter slightly depending on the digital driving level of the primary, it is insufficient to match them at a single level. Instead, they need to be matched ideally at every digital driving level. This will provide a relation between the tristimulus values and measurements in the entire range of possible values. To obtain a conversion between any measured value, and the desired tristimulus value, an interpolation is needed to obtain a continuous conversion curve. This results in three conversion curves per display primary that convert the measured value in the XYZ tristimulus values. In the case of a monochrome display, three conversion curves are obtained when using this calibration methodology. In the case of a color display, this calibration needs to be done for each of the display's primaries. This results in 9 conversion curves, in the typical case when the display has 3 primaries. Note that a specific colored patch with a specific driving of the red, green and blue primary will have a specific spectrum, which is a superposition of the scaled spectra of the red, green and blue primaries, and hence every possible combination of the driving levels needs to be calibrated individually. Therefore, an alternative methodology needs to be used: the red, green and blue driving needs to be applied individually, while the other channels remain at the lowest possible level (emitting the least possible light, ideally no light at all). This methodology also implies that the red, green and blue driving of the patch needs to be done sequentially. Obtaining the XYZ tristimulus values is now evident when using a monochrome display. The light to be measured can simply be generated on the display (in the form of uniform patches), and measured by the sensor according to embodiment of the present invention, when using the different conversion curves. Measuring the XYZ tristimulus values of any colored patch when using a color display is somewhat more complicated. A desired patch has a specific driving level for the red, green and blue. As mentioned earlier, the red green and blue driving needs to be applied sequentially. The correct three conversion curves corresponding to the specific color will need to be applied to obtain the XYZ tristimulus values from the measured values. This results in three sets of tristimulus values: (XRYRZR), (XGYGZG) and (XBYBZB). Since the XYZ tristimulus values are additive, the XYZ tristimulus values of the patch can be obtained using the following formulae:

$X\text{patch} = XR + XG + XB$ $Y\text{patch} = YR + YG + YB$ $Z\text{patch} = ZR + ZG + ZB$ Note that we assume the display has no crosstalk in these formulae. Two parts can be distinguished in the XYZ tristimulus values. Y is directly a measure of brightness (luminance) of a color. The chromaticity, on the other hand, can be specified by two derived parameters, x and y. These parameters can be obtained from the XYZ tristimulus values using the following formulae:

$$x = \frac{X}{X+Y+Z}$$
$$y = \frac{Y}{X+Y+Z}$$

This offline color measurement which is enabled by calibrating the sensor to an external sensor which is able to measure tristimulus values (X, Y & Z) Thus allows measuring brightness as well as chromaticity.

In one method, each coupling device 10 carries light that is representative for light coming out of a pre-determined area 5 of the display device 1. Setting the display 3 full white or using a white dot jumping from one area to another area 5 gives exact measurements of the light output in each area 5.

However, by this method it is not possible to perform continuous measurements without the viewer noticing it. In this case the relevant output light property, e.g. colour or luminance, should be calculated depending on the image information, radiation pattern of a pixel and position of a pixel with respect to the coupling device 11. Image information determines the value of the relevant property of light, e.g. how much light is coming out of a specific area 5 (for example a pixel of the display 3) or its colour.

Consider the example of optical fibers 22 shaped like a beam, i.e. with a rectangular cross-section, in the plane parallel front glass plate 23, for instance a plate 23 made of fused silica. To guide the light through the fibers 22, the light must be travelling in one of the conductive modes. For light coming from outside the fibers 22 or from outside the plate 23, it is difficult to be coupled into one of the conductive modes. To get into a conductive mode a local alteration of the fiber 22 is needed. Such local alteration may be obtained in different manners, but in this case there are important requirements than just getting light inside the fiber 22.

For accurate measuring it is important that only light from a specific direction (directed from the corresponding display area 5 into the viewing angle of the display device) enters into the corresponding coupling device 10 (fiber 22). Hence light from outside the display device 1 ('noisy' light) will not interfere with the measurement.

Additionally, it is important that upon insertion into the light guide member, f.i. fiber or waveguide, the image displayed is hardly, not substantially or not at all disturbed.

According to the invention, use is made of an incoupling member 13 for coupling light into the light guiding member. The incoupling member 13 is a structure with limited dimensions applied locally at a location corresponding to a display area. The incoupling member 13 has a surface area that is typically much smaller than that of the display area, for instance at most 1% of the display area, more preferably at most 0.1% of the display area. Suitably, the incoupling member is designed such that it leads light to a lateral direction.

Additionally, the incoupling member may be designed to be optically transparent in at least a portion of its surface area for at least a portion of light falling upon it. In this manner the portion of the image corresponding to the location of the incoupling member is still transmitted to a viewer. As a result, it will not be visible. It is observed for clarity that such partial transparency of the incoupling member is highly preferred, but not deemed essential. Such minor portion is for instance in an edge region of the display area, or in an area between a first and a second adjacent pixel. This is particularly feasible if the incoupling member is relatively small, e.g. for instance at most 0.1% of the display area.

In a further embodiment, the incoupling member is provided with a ground plane that is circular, oval or is provided with rounded edges. The ground plane of the incoupling member is typically the portion located at the side of the viewer. Hence, it is most essential for visibility. By using a ground plane without sharp edges or corners, this visibility is reduced and any scattering on such sharp edges are prevented.

A perfect separation may be difficult to achieve, but with the sensor system 6 comprising the coupling device 10 shown in FIG. 2 a very good signal-to-noise-ratio (SNR) can be achieved.

Figure 8:
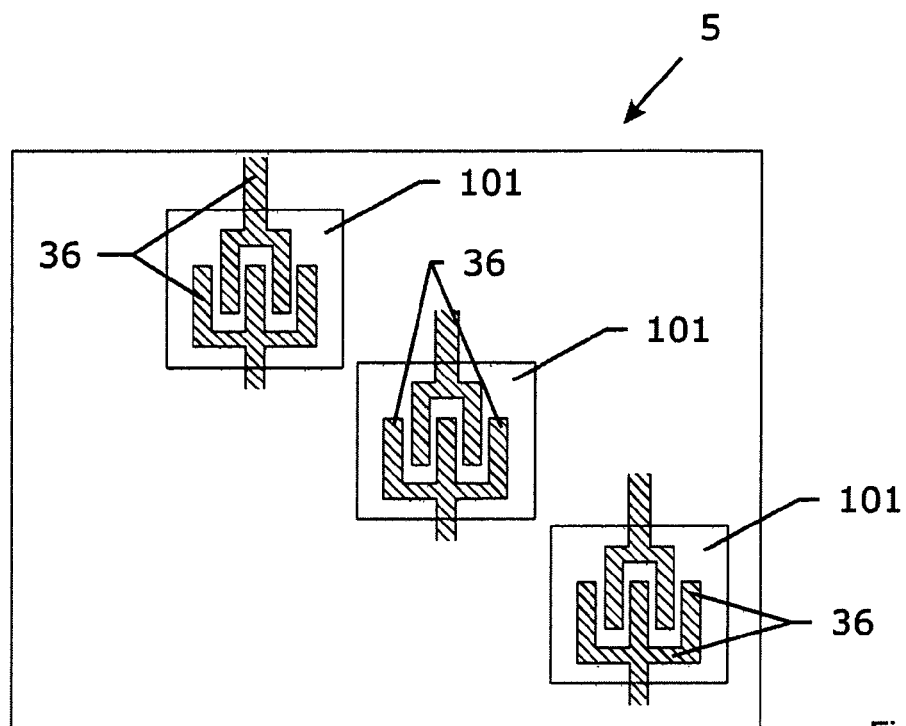
FIG. 8 shows a schematic view of a network of sensors with a single layer of electrodes used in the display device, according to a preferred embodiment of present invention.

In another preferred embodiment a coupling device such as an incoupling member is not required. For example, organic photoconductive sensors can be used as the sensors. The organic photoconductive sensors serve as sensors themselves (their resistivity alters depending on the impinging light) and because of that they can be placed directly on top of the location where they should measure (for instance, a voltage is put over its electrodes, and a impinging-light dependent current consequentially flows through the sensor, which is measured by external electronics). Light collected for a particular display area 5 does not need to be guided towards a sensor 9 at the periphery of the display. In a preferred embodiment, light is collected by a transparent or semi-transparent sensor 101 placed on each display area 5. The conversion of photons into charge carriers is done at the display area 5 and not at the periphery of the display and therefore the sensor, although transparent, will not be visible but will be within/inside the viewing angle. Just as for the sensor system 6 of FIG. 1, this embodiment may also have a sensor array 7 comprising, e.g. a plurality of groups, such as eight groups 8 of sensors 9, 101. Each of said groups 8 comprises a plurality of sensors, e.g. ten sensors 9 and correspond to one of the groups 4 of display areas 5. Each of the sensors 9 corresponds to one corresponding display area 5 as illustrated in FIG. 8.

FIG. 5 shows a side view of a sensor system 9 according to a second embodiment of the invention. The sensor system of this embodiment comprises transparent sensors 33, which are arranged in a matrix with rows and columns. The sensors can for instance photoconductive sensors, hybrid structures, composite sensors, etc. The sensor 33 can be realized as a stack comprising two groups 34, 35 of parallel bands 36 in two different layers 37, 38 on a substrate 39, preferably the front glass plate 23. An interlayer 40 is placed between the bands 36 of the different groups 35, 36. This interlayer is preferably a photosensitive layer. The bands (columns) of the first group 34 are running perpendicular to the bands (rows) of the second group 35 in a parallel plane. The sensor system 6 divides the display area 1 into different zones, by design, which is clear for anyone skilled in the art, each with its own optical sensor connected by transparent electrodes.

The addressing of the sensors may be accomplished by any known array addressing method and/or devices. For example, a multiplexer (not shown) can be used to enable addressing of all sensors. In addition a microcontroller is also present (not shown). The display can be adapted, e.g. by a suitable software executed on a processing engine, to send a signal to the microcontroller (e.g. via a serial cable: RS232). This signal determines which sensor's output signal is transferred. For example, a 16 channel analogue multiplexer ADG1606 (of Analog Devices) is used, which allows connection of a maximum of 16 sensors to one drain terminal (using a 4 bit input on 4 selection pins).

The multiplexer is a preferably a low-noise multiplexer. This is important, because the signal measured is typically a low-current analogue signal, therefore very sensitive to noise. The very low (4.5Ω) on-resistance makes this multiplexer ideal for this application where low distortion is needed. This on-resistance is negligible in comparison to the resistance range of the sensor material itself (e.g. of the order of magnitude MΩ-100 GΩ). Moreover, the power consumption for this CMOS multiplexer is low.

To control the multiplexer switching, a simple microcontroller can be used (e.g. Basic Stamp 2) that can be programmed with Basic code: i.e. its input is a selection between 1 and 16; its output goes to the 4 selection pins of the multiplexer.

To communicate with the sensor, a layered software structure is foreseen. The layered structure begins from the high-level implementation in QAWeb, which can access BarcoMFD, a Barco in-house software program, which can eventually communicate with the firmware of the display, which handles the low-level communication with the sensor. In fact, by communicating with an object from upper levels, the functionality can be accessed quite easily.

The communication with the sensor is preferably a two-way communication. For example, the command to "measure" can be sent from the software layer and this will eventually be converted into a signal activating the sensor (e.g. a serial communication to the ADC to ask for a conversion), which puts the desired voltage signal over the sensor's electrodes. The sensor (selected by the multiplexer at that moment in time) will respond with a signal depending on the incoming light, which will eventually result in a signal in the high-level software layer.

Figure 6A:
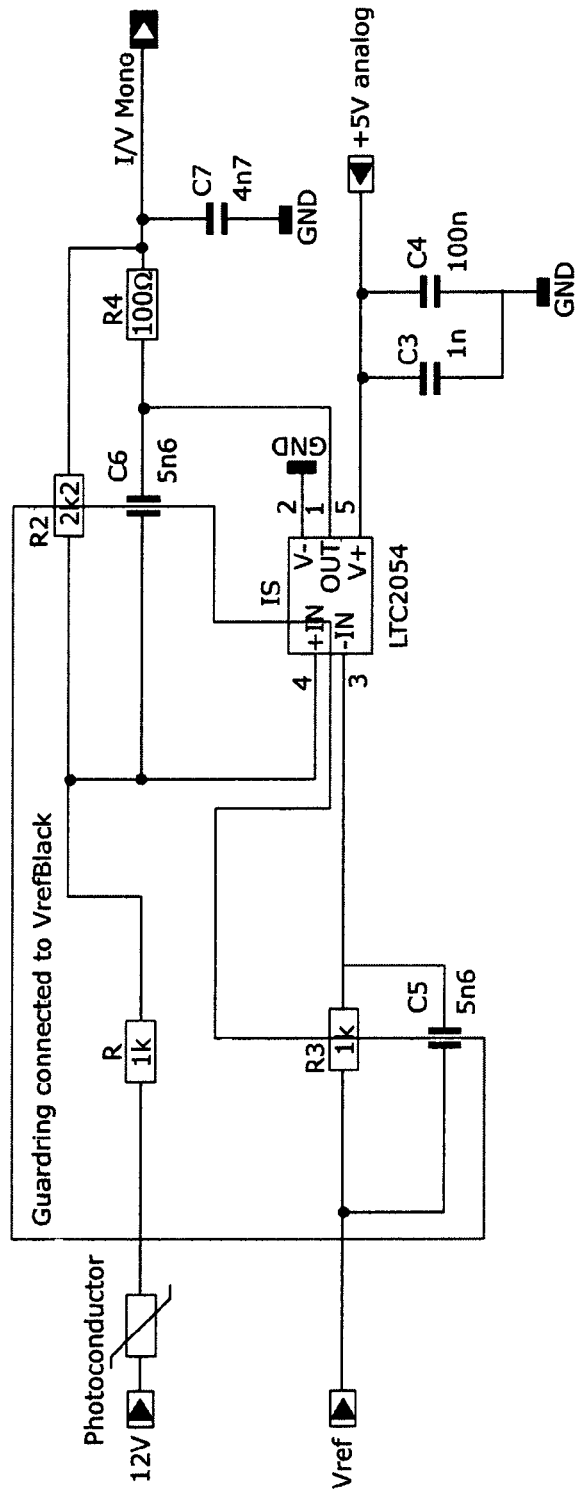
FIG. 6a shows the first stage of amplification used for a display device with a sensor system.
Figure 6B:
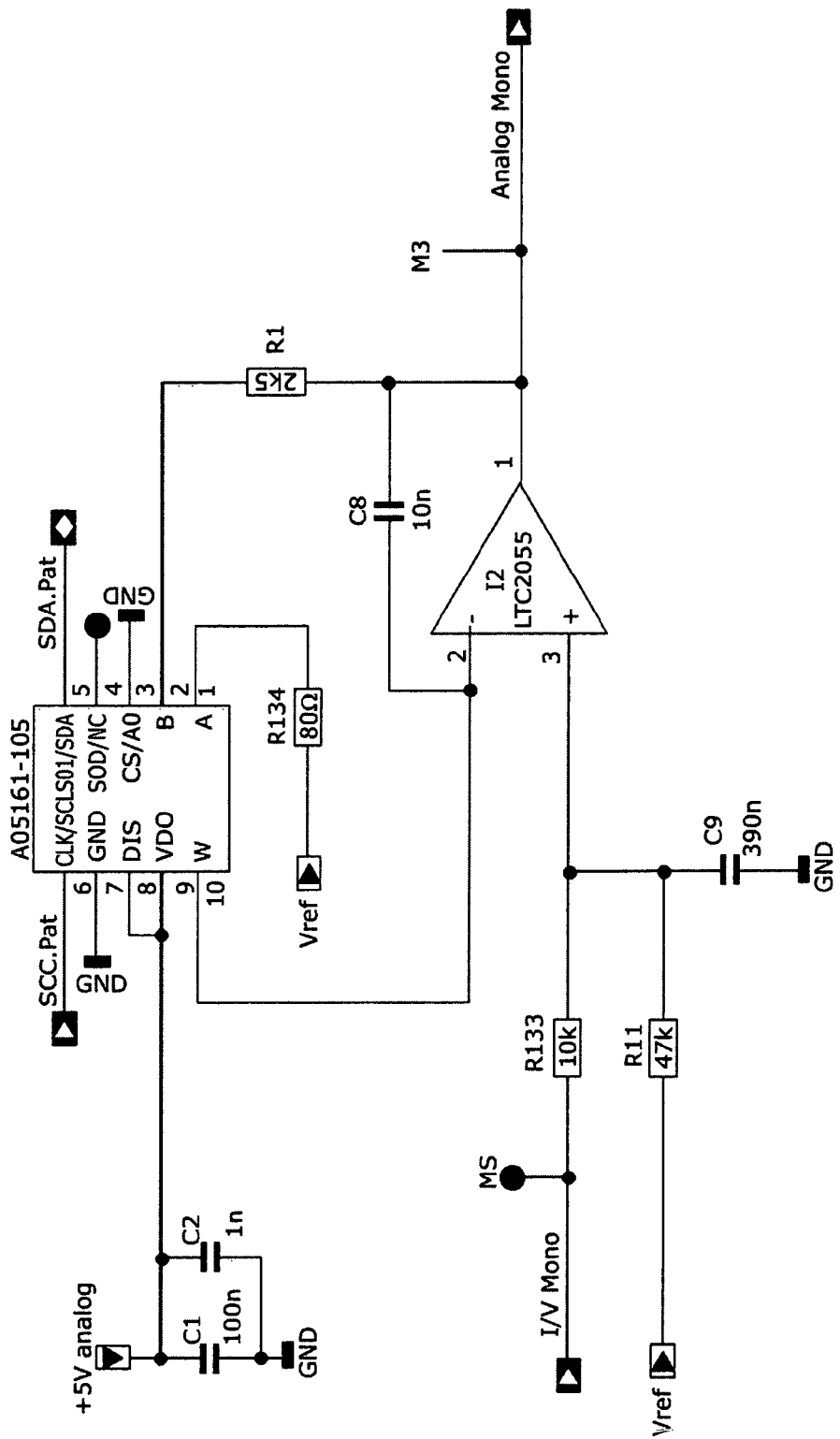
FIG. 6b shows the second stage of amplification used for a display device with a sensor system.
Figure 6C:
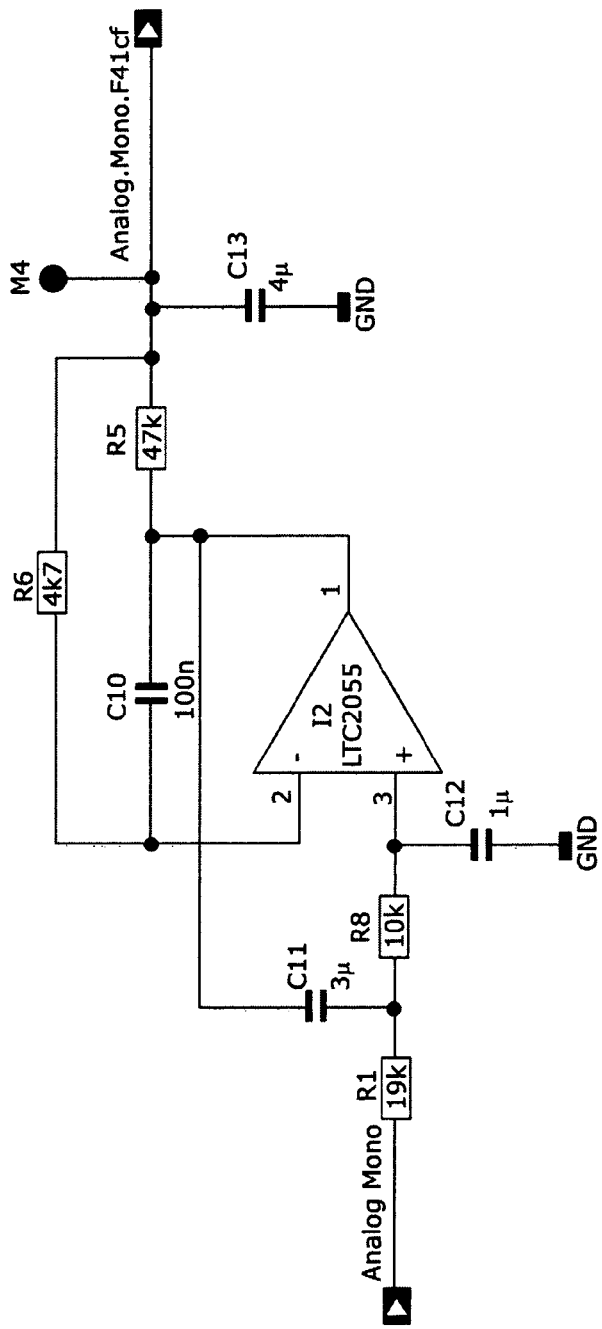
FIG. 6c shows the first stage of amplification used for a display device with a sensor system.

In order to reach the eventual high-level software layer, the analogue signal generated by the sensor and selected by the multiplexer is preferably filtered, and/or amplified and/or digitized. The types of amplifiers used are preferably low noise amplifiers such as LT2054 and LT2055: zero drift, low noise amplifiers. Different stages of amplification can be used. For example in an embodiment stages 1 to 3 are illustrated in FIGS. 6a to 6c respectively. In a first stage the current to voltage amplification has a first factor, e.g. with factor $2.2 \times 10^6 \Omega$. In a second stage closed loop amplification is adjustable by a second factor, e.g. between about 1 and 140 (using a digital potentiometer). And finally in a third stage low band pass filtering is enabled (first order, with f0 at about 50 Hz (cfr RC constant of 22 ms)).

Digitization can be by an analog to digital, converter (ADC) such as an LTC 2420—a 20 bit ADC which allows to differentiate more than $10^6$ levels between a minimum and maximum value. For a typical maximum of 1000 Cd/m$^2$ (white display, backlight driven at high current), it is possible to discriminate 0.001 Cd/m$^2$ if no noise is present.

In addition the current timing in the circuit is mainly determined by setting of a ΔZ-ADC such as LTC2420. Firstly, the most important time is the conversion time from analogue to digital (about 160 ms, internal clock is used with 50 Hz signal rejection). Secondly, the output time of the 24 clock cycles needs to read the 20 bit digital raw value out of the serial register of LTC2420 which is of secondary importance (e.g. over a serial 3-wire interface). The choice of the ADC (and its setting) corresponds to the target of stable high resolution light signals (20 bit digital value, averaged over a time of 160 ms, using 50 Hz filtering).

Figure 7:
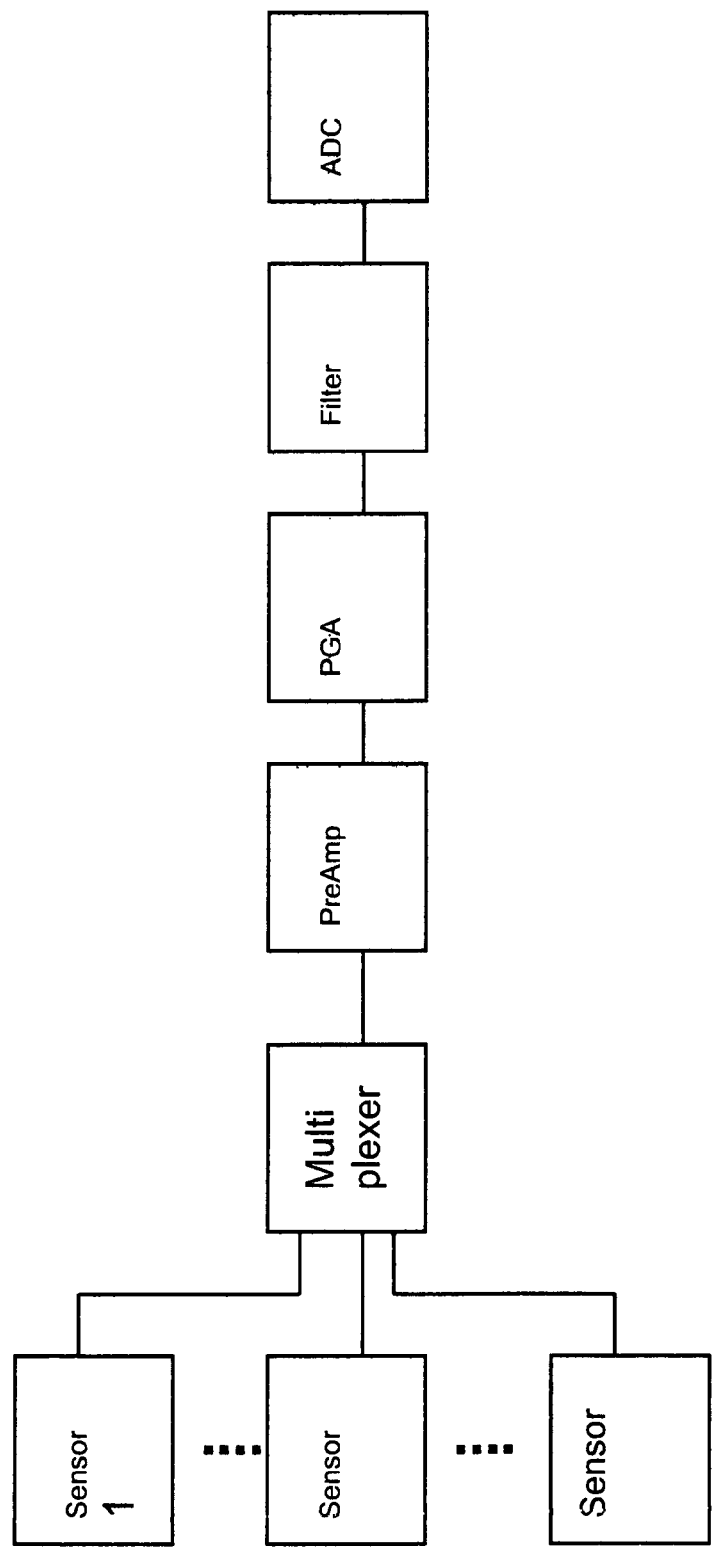
FIG. 7 illustrates the overview of the data path from the sensor to an ADC.

Additionally FIG. 7 illustrates the overview of data path from the sensor to the ADC. The ADC output can be provided to a processor, e.g. in a separate controller or in the display.

The embodiments that utilize a transparent sensor positioned on top of the location where it is desirable to measure, require suitable transparent electrodes, that allow the electronic signal to be guided towards the edge, where it can be analyzed by the external electronics.

Suitable materials for the transparent electrodes are for instance ITO (Indium Tin Oxide) or poly-3,4-ethylenedioxythiophene polystyrene acid (known in the art are PEDOT-PSS). This sensor array 7 can be attached to the front glass or laminated on the front glass plate 23 of the display device 2, for instance an LCD.

The difference between using a structure comprising an inorganic transparent conductive material such as ITO or for instance a thin structure such as proposed in the article of J. H. Ho et al in Applied Physics Letters 93 is not only the use of an inherently transparent material such as ITO instead of an inherently non-transparent material such as gold electrodes. The work function of the electrode material influences the efficiency of the sensor. In the bilayer photoconductive sensor created in the previously mentioned article, a material with a higher work function is most likely more efficient. Therefore, Au is used which has a work function of around 5.1 eV, while ITO has a work function of typically 4.3-4.7 eV, This would result in a worse performance. These known designs seem to teach away from ITO at least when one expects an efficient sensor. The article cited above uses gold as electrode, U.S. Pat. No. 6,348,290 suggests the use of a number of metals including Indium or an alloy of Indium (see also column 7 lines 25-35 of U.S. Pat. No. '290). Conductive tin oxide is not named, Furthermore, U.S. Pat. No. 6,348,290 suggests using an alloy because of its superiority in e.g. electrical properties. However, when ITO is used in stead of gold, it was an unexpected finding that the structure would work so well as to be usable for the monitoring of luminance in a display. Also, previous known designs did not aim to create a transparent sensor, since gold or other metal electrodes are used, which are highly light absorbing. In accordance with embodiments of the present invention, use is made of an at least partially transparent electrode material. This is for instance ITO.

Returning to FIG. 8, the organic layer(s) 101 is preferably an organic photoconductive layer, and may be a monolayer, a bilayer, or a multiple layer structure. Most suitably, the organic layer (s) 101 comprises an exciton generation layer (EGL) and a charge transport layer (CTL). The charge transport layer (CTL) is in contact with a first and a second transparent electrode, between which a voltage difference may be applied. The thickness of the CTL can be for instance in the range of 25 to 100 nm, f.i. 80 nm. The EGL layer may have a thickness in the order of 5 to 50 nm, for instance 10 nm. The material for the EGL is for instance a perylene derivative. One specific example is 3,4,9,10-perylenetetracarboxylic bisbenzimidazole (PTCBI). The material for the CTL is typically a highly transparent p-type organic semiconductor material. Various examples are known in the art of organic transistors and hole transport materials for use in organic light emitting diodes. Examples include pentacene, poly-3-hexylthiophene (P3HT), 2-methoxy, 5-(2'-ethyl-hexyloxy)-1,4-phenylene vinylene (MEH-PPV), N,N'-bis(3-methylphenyl)-N,N'¬-diphenyl-1,1'-biphenyl-4,4'-diamine (TPD). Mixtures of small molecules and polymeric semiconductors in different blends could be used alternatively. The materials for the CTL and the EGL are preferably chosen such that the energy levels of the orbitals (HOMO, LUMO) are appropriately matched, so that excitons dissociate at the interface of both layers. In addition to these layers, a charge separation layer (CSL) may be present between the CTL and the EGL in one embodiment. Various materials may be used as charge separation layer, for instance A103. Instead of using a bilayer structure, a monolayer structure can also be used. This configuration is also tested in the referenced paper, with only an EGL. Again, in the paper, the electrodes are Au, whereas we made an embodiment with ITO electrodes, such that a (semi) transparent sensor can be created. Also, we created embodiments with other organic layers, both for the EGL as well as the CTL, such as PTCDA, with ITO electrodes. In a preferred embodiment, PTCBi as EGL and TMPB as CTL were applied. The organic photoconductive sensor may be a patterned layer or may be a single sheet covering the entire display. In the latter case, each of the display area 5 will have its own set of electrodes but they will share a common organic photosensitive layer (simple or multiple). The added advantage of a single sheet covering the entire display is that the possible color specific absorption by the organic layer will be uniform across the display. In the case where several islands of organic material are separated on the display, non-uniformity in luminance and or color is more difficult to compensate.

In one further implementation, the electrodes are provided with fingered shaped extensions, as presented in FIG. 8 as well. The extensions of the first and second electrode preferably form an interdigitated pattern. The number of fingers may be anything between 2 and 5000, more preferably between 100 and 2500, suitably between 250 and 1000. The surface area of a single transparent sensor may be in the order of square micrometers but is preferable in the order of square millimeters, for instance between 1 and 7000 square millimeters. One suitable finger shape is for instance a 1500 by 80 micrometers size, but a size of for instance 4×6 micrometers is not excluded either. The gap in between the fingers can for instance be 15 micrometers in one suitable implementation.

In connection with said further implementation, it is most suitable to build up the sensor on a substrate with said electrodes. The organic layer 101 therein overlies or underlies said electrodes. In other words, in FIG. 8 a network of sensors 9 with a single layer of electrodes 36 is illustrated. Electrodes 36 are made of a transparent conducting material like any of the materials described above e.g. ITO (Indium Tin Oxide) and are covered by organic layer(s) 101. In addition, the organic photoconductive sensor does not need to be limited laterally. The organic layer may be a single sheet covering the entire display (not shown). Each of the display areas 5 will have its own set of electrodes 36 (one of the electrodes can be shared in some embodiments where sensors are addressed sequentially) but they can share a common organic photosensitive layer (simple or multiple). The added advantage of a single sheet covering the entire display is that the possible color specific absorption by the organic layer will be to a major extent uniform across the display. In the case where several islands of organic material are separated on the display, non-uniformity in luminance and or color is more difficult to compensate.

The first and a second electrode may, on a higher level, be arranged in a matrix (i.e. the areas where the finger patterns are located are arranged over the display's active area according to a matrix) for appropriate addressing and read out, as known to the skilled person. Most suitably, the organic layer (s) is/are deposited after provision of the electrodes. The substrate may be provided with a planarization layer.

Optionally, a transistor may be provided at the output of the photosensor, particularly for amplification of the signal for transmission over the conductors to a controller. Most suitably, use is made of an organic transistor. Electrodes may be defined in the same electrode material as those of the photodetector.

The organic layer(s) 101 may be patterned to be limited to one display area 5, a group of display areas 5, or alternatively certain pixels within the display area 5. Alternatively, the interlayer is substantially unpatterned. Any color specific absorption by the transparent sensor will then be uniform across the display.

Alternatively, the organic layer(s) 101, as illustrated in FIG. 8, may comprise nanoparticles or microparticles, either organic or inorganic and dissolved or dispersed in an organic layer. A further alternative are organic layer(s) 101 comprising a combination of different organic materials. As the organic photosensitive particles often exhibit a strongly wavelength dependent sensitive absorption coefficient, such a configuration can result in a less colored transmission spectrum. It may further be used to improve detection over the whole visible spectrum, or to improve the detection of a specific wavelength range Suitably, more than one transparent sensor may be present in a display area 5, as illustrated in FIG. 8. Additional sensors may be used for improvement of the measurement, but also to provide different colour-specific measurements. Additionally, by covering substantially the full front surface with transparent sensors, any reduction in intensity of the emitted light due to absorption and/or reflection in the at least partially transparent sensor will be less visible or even invisible, because position-dependant variations over the active area can be avoided this way.

Returning to FIG. 5, we note that by constructing the sensor 9 as shown in FIG. 5, the sensor surface of the transparent sensor 30 is automatically divided in different zones. A specific zone corresponds to a specific display area 5, preferably a zone consisting of a plurality of pixels, and can be addressed by placing the electric field across its columns and rows. The current that flows in the circuit at that given time is representative for the photonic current going through that zone.

This sensor system 6 cannot distinguish the direction of the light. Therefore the photocurrent going through the transparent sensor 30 can be either a pixel of the display area 5 or external (ambient) light. Therefore reference measurements with an inactive backlight device are suitably performed.

Suitably, the transparent sensor is present in a front section between the front glass and the display. The front glass provides protection from external humidity (e.g. water spilled on front glass, the use of cleaning materials, etc.). Also, it provides protection form potential external damaging of the sensor. In order to minimize negative impact of any humidity present in said cavity between the front glass and the display, encapsulation of the sensor is preferred.

Figure 9:
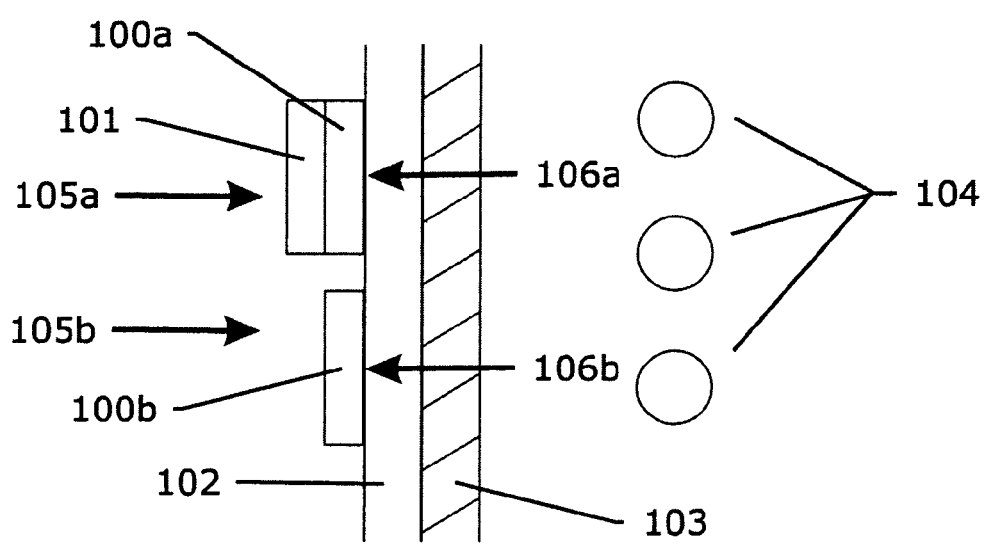
FIG. 9 shows the schematic illustration of a display device and the isolation of the ambient light signal.
Figure 10:
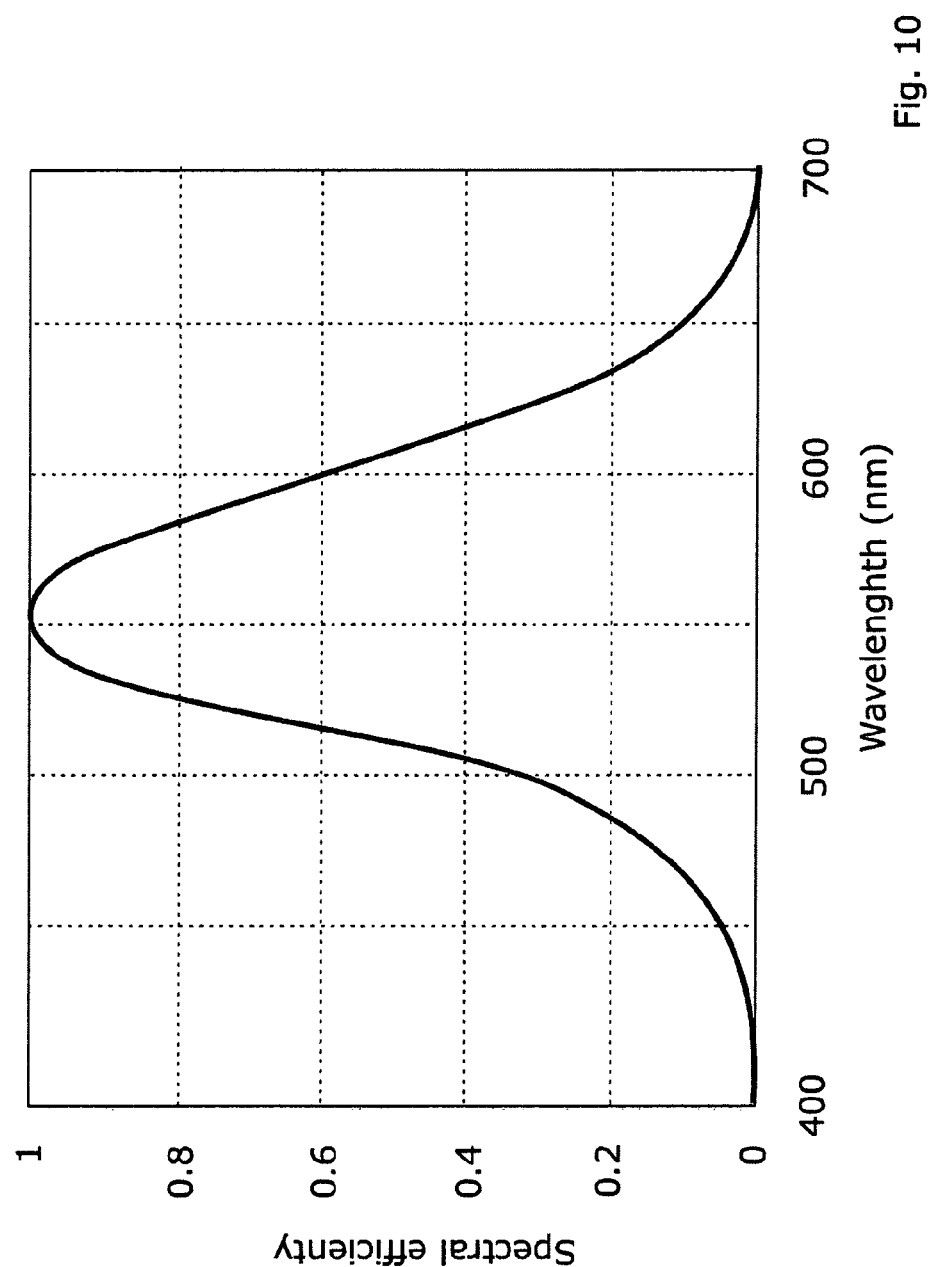
FIG. 10 shows a $V(\lambda)$ curve.

FIG. 9 shows an alternative embodiment of the invention relating to a sensor system 6 with an optical filter to be used in the measurement of ambient light. Sensors 100a and 100b are deposited/placed on a transparent substrate 102 (e.g. a glass) panel such as one that comes in front of a (typical) LCD panel 103 or directly onto the display. In an alternative embodiment the display can comprise an air gap in between the front glass and the panel, hence it is placed in front of the (LCD) panel, at a certain distance. In this embodiment, the sensor is preferably created on the side of the front glass facing the display (or on an additional layer positioned adjacent to the front glass, at the side facing the display), hence the sensor is facing the display.

The LCD display is backlit by light sources 104 (e.g. cold cathode fluorescent lights, LEDs . . . ). Sensor 100a is also covered by an optical filter 101. A first amount of ambient light (AL) 105a impinges on filter 101 before being transmitted to sensor 100a. A first amount of "display" light (DL) 106a reaches sensor 100a. A second amount of ambient light 105b reaches sensor 100b. A second amount of "display" light 106b reaches sensor 100b. In a first approximation, we will assume that the first and second amount of ambient light 105a and 105b are identical/equal. This condition may be fulfilled in most practical cases when sensors 100a and 100b are close enough to each other and small enough. In addition we also assume that the first and second amount of display lights 106a and 106b are equal. This may be taken care of electronically (by driving the LCD panel so that the both sensors 100a and 100b receive the same amount of light (for instance, it may be necessary to compensate for potential non-uniformities of the light generated by the backlight)).

Let VOut a and VOut b be the output signals of sensors 100a and 100b respectively. We have for VOut a and VOut b:

$$VOut a = a*AL + b*DL \quad (1)$$

$$VOut b = c*AL + d*DL \text{ (where * indicates multiplication)} \quad (2)$$

Note that it is assumed here that the sensor has a linear response to the impinging light level of the ambient light and light emitted by the display. This may require an additional (software) calibration step if the sensor does not respond linearly by fundamental design. The coefficients a and c are different by way of the filter 101 (a<c). The coefficients b and d may be different (for instance, the filter 101 may be responsible for reflecting of a part of the display light not absorbed by the sensor 100b, resulting in b being larger than d The determinant a*d−b*c of the linear system of equations (1) and (2) in the unknowns AL (ambient light) and DL (display light) is non zero by an ad-hoc choice of the filter 101 (e.g. material, pigment and/or thickness of the filter impact coefficient d and influence the value of the determinant). The system may thus be solved for AL and DL once a, b, c and d have been characterized.

The set of equations (1) and (2) shows that the sensors 100a and 100b are used in tandem to discriminate between different sources of light that contribute to the output signals of the sensors. A calibration to a reference sensor that has a response according to the V(λ) curve can be used to obtain the actual values, as previously discussed.

When light coupling devices to couple in and guide display light to sensors outside the field of view of the display according to embodiments of the present invention are used, the same set of linear equations as (1) and (2) can be obtained by covering all or part of the coupling devices with a filter 101. In particular, when two light guides bring the light of a given display area to a first and second sensor (transparent or not) outside the field of view of the display (e.g. in the bezel), a filter 101 is associated to one of the light coupling devices (e.g. between the surface of the light guide and ambient) and a system of equation like (1) and (2) is obtained mutatis mutandis and can be solved for AL and DL.

The coefficients a, b, c and d may be obtained e.g. as follows: AL is imposed (calibrated light source) while the backlight is switched off (DL=0). In that case, a=VOut a/AL and c=VOut b/AL. The coefficients b and d are similarly obtained with AL=0 and DL known (all light valves open and the luminance of the display panel measured).). The coefficients a, b, c & d can be determined upfront, as they are related to the design of the display, sensor and filter, which remains constant over the display's lifetime.

The filter 101 may be e.g. a polarizing filter that will only transmit light with the right polarization. In some instances, the filter 101 may be integrated into or (structural) part of to the sensor 100a, as in the case of a sensor sensitive to a specific polarization of the light discussed elsewhere in this description. Indeed, if the sensor 100a contains a layer of organic material, "rubbing" the organic material can generate an integrated filter. In addition the filter 101 might be a simple linear polarizing filter, or partial linear polarizer filters that are applied suitably such that they transmit the polarization emitted by the display. In general, any filter that will force the two linear equations (1) and (2) to be linearly independent will do.

In some specific embodiments, it is possible to modify the arrangement of FIG. 9 as follows: the filter 101 may be placed between the display and sensor. In that case, a first amount of display light (DL) 106*a* impinges on filter 101 before being transmitted to sensor 100*a*. A set of linear equations similar to (1) and (2) is solved for the unknowns AL and DL in order to isolate the contributions of the ambient light to the output signals of sensors 100*a* and 100*b*. For instance, the filter 101 can be designed such that it reduces the reflection of the panel, which leads to two independent equations (1) and (2). For instance, the coefficient a can become smaller than coefficient c due to the reduced reflection of this impinging ambient light on the panel. When the filter 101 is put in between the substrate 102 and the LCD panel 103 at the position of sensor 100*a*, we can make sure that the determinant of the equations (1) and (2) is non zero. The filter needs to reduces the reflection of the panel. In this design, 0<d<b because DL needs to pass the filter before it reaches sensor 100*a*. Furthermore, 0<a<c because AL passes through both sensors and generates same Vout, but when reflected on the panel i.e. panel+filter and goes back on the sensors, sensor 100 a will have a smaller Vout because of the reduced reflectivity of the panel and the filter.

It is conceivable to modify the arrangement of FIG. 9 to produce two linearly independent equations time sequentially instead of simultaneously. Filter 101 may be an externally added filter applied intermittently. A finger pressed against the sensor 100*a* will prevent most of the Ambient light from reaching the sensor 100*a* for as long as the finger is pressed. In that case, the output signal of sensor 100*a* is:

$$VOut1 = bDL \tag{1'}$$

Once the finger is no longer pressed, one has following expression:

$$VOut2 = cAL + dDL \text{ with } a \ll c \text{ and } d \text{ not necessarily equal to } b. \tag{2'}$$

Solving the set of equations (1') and (2') under the assumption that DL has remained constant allows one to isolate AL and DL by solving the set of linear equations (1') and (2'). Instead of applying a finger, one could rely on a filter 101 that is a switchable filter (e.g. a switchable polarizer). In a first state is the filter inactive and the sensor's output as given by (1). In a second state, the filter 101 is activated (electrically) and the sensor's output is given by (2).

When light guides are used to guide display light to sensors not in the field of view of the display, the same set of linear equations as (1) and (2) can be obtained by covering all or part of the light guides with a filter 101. In particular, when two light guides bring the light of a given display area to a first and second sensors (transparent or not) not in the field of view of the display (e.g. in the bezel), a filter 101 is associated to one of the light guides (e.g. between the surface of the light guide and ambient). A system of equation like (1) and (2) is obtained mutatis mutandis and can be solved for AL and DL.

In another embodiment of this invention, use can be made of the typical driving of the backlight unit which is integrated in the design of a transmissive liquid crystal display. The backlight unit typically is Pulse Width Modulated (PMW) driven, which can be used advantageously in the scope of this invention. The methods comprises of following steps:

In a first embodiment:
Switching on the blinking of the backlight
Switching on an electronic filter in combination with the sensor according to embodiments of the present invention, in which the filter is designed to obtain two sets of measurements from the sensor. The first set is made in the period where the backlight is switched off in which only ambient light is sensed, while the second set is made in the period the backlight is switched on hence both ambient light and light emitted by the display are measured Using both measurement sets of the previous step, it is possible to determine the part of the output signal induced by the different sources of light. Hence, it is possible do eliminate the contribution of the ambient light.

In this embodiment, the blinking should be done in such a way that the period in which the backlight is switched on and the period in which the backlight is switched off are sufficiently long to ensure that the sensor is capable to properly measure both sets of measurements.

In an alternative embodiment, the same can be done based on the measurements at different points in time on the PWM signal, even without using blinking, more precisely at the moments in time when the backlight is switched on and when it is switched off. The disadvantage of this embodiment is that sensors are required with a very fast response time in this embodiment.

In another embodiment, the following steps can be taken:
Switching on the backlight unit with blinking
Using an electronic filter on the output of the sensor to detect the average light captured, whereby said light captured is a combination of the display light and the ambient light
Switching off the blinking of the backlight unit Using an electronic filter on the output of the sensor to detect the average light captured, whereby said light captured is a combination of the display light and the ambient light
Using both measurements sets of the previous step to determine the part of the output signal induced by the different sources of light, based on a model. Hence, it is possible do eliminate the contribution of the ambient light, and measure the light emitted by the display only.

The advantage of these methods and arrangements is that the backlight is not switched off completely which means normal viewing can be continued.

FIG. 4 shows a horizontal sectional view of a display device 1 with a sensor system 6 according to a fourth embodiment of the invention. The present embodiment is a scanning sensor system. The sensor system 6 is realized as a solid state scanning sensor system localized the front section of the display device 1. The display device 1 is in this example a liquid crystal display, but that is not essential. This embodiment provides effectively an incoupling member. The substrate or structures created therein (waveguide, fibers) may be used as light guide members.

In accordance with this embodiment of the invention, the solid state scanning sensor system is a switchable mirror. Therewith, light may be redirected into a direction towards a sensor. The solid state scanning system in this manner integrates both the incoupling member and the light guide member. In one suitable embodiment, the solid state scanning sensor system is based on a perovskite crystalline or polycrystalline material, and particularly the electro-optical materials family. Typical examples of such materials include lead zirconate titanate (PZT), lanthane doped lead zirconate titanate (PLZT), lead titanate (PT), bariumtitanate (BaTiO₃), bariumstrontiumtitantate (BaSrTiO3). Such materials may be further doped with rare earth materials and may be provided by chemical vapour deposition, by sol-gel technology and as particles to be sintered. Many variations hereof are known from the fields of capacitors, actuators and microactuators (MEMS).

In one example, use was made of PLZT. An additional layer 29 can be added to the front glass plate 23 and may be an optical device 10 of the sensor system 6. This layer is a conductive transparent layer such as a tin oxide, e.g. preferably an ITO layer 29 (ITO: Indium Tin Oxide) that is divided in line electrodes by at least one transparent isolating layer 30. The isolating layer 30 is only a few microns (μm) thick and placed under an angle β. The isolating layer 30 is any suitable transparent insulating layer of which a PLZT layer (PLZT: lanthanum-doped lead zirconate titanate) is one example. The insulating layer preferably has a similar refractive index to that of the conductive layer or at least an area of the conductive layer surrounding the insulating layer, e.g. 5% or less difference in refractive index. However, when using ITO and PLZT, this difference can be larger, a PLZT layer can have a refractive index of 2.48, whereas the ITO layer 29 has a refractive index of 1.7. The isolating layer 31 is an electro-optical switchable mirror 31 for deflecting at least one part of the light emitted from the display area 5 to the corresponding sensor 9 and is driven by a voltage. The insulating layer can be an assembly of at least one ITO sub-layer and at least one glass or IPMRA sub-layer.

In one further example, a four layered structure was manufactured. Starting from a substrate, f.i. a corning glass substrate, a first transparent electrode layer was provided. This was for instance ITO in a thickness of 30 nm. Thereon, a perovskite layer was grown, in this example by CVD technology. The layer thickness was approximately 1 micrometer. The deposition of the PZT layer may be optimized with nucleation layers as well as the deposition of several subsequent layers, that do not need to have the same composition. A further electrode layer was provided on top of the PZT layer, for instance in a thickness of 100 nm. In one suitable example, this electrode layer was patterned in fingered shapes. More than one electrode may be defined in this electrode layer. Subsequently, a polymer was deposited. The polymer was added to mask the ITO finger pattern. When to this structure a voltage is applied between the bottom electrode and the fingers on top of the PZT the refractive index of the PZT under each of the fingers will change. This change in refractive index will result in the appearance of a diffraction pattern. The finger pattern of the top electrode is preferably chosen so that a diffraction pattern with the same period would diffract light into a direction that would undergo total internal reflection at the next interface of the glass with air. The light is thereafter guided into the glass, which directs the light to the sensors positioned at the edge. Therewith, all it is achieved those diffraction orders higher than zero are coupled into the glass and remain in the glass. Optionally, specific light guiding structures, e.g. waveguides may be applied in or directly on the substrate.

While it will be appreciated that the use of ITO is here highly advantageous, it is observed that this embodiment of the invention is not limited to the use of ITO electrodes. Other at least partially transparent materials may be used as well. Furthermore, it is not excluded that an alternative electrode pattern is designed with which the perovskite layer may be switched so as to enable diffraction into the substrate or another light guide member.

The solid state scanning sensor system has no moving parts and is advantageous when it comes to durability. Another benefit is that the solid state scanning sensor system can be made quite thin and doesn't create dust when functioning.

An alternative solution can be to use a reflecting surface or mirror 28 that scans (passes over) the display 3, thereby reflecting light in the direction of the sensor array 7. Other optical devices may be used that are able to deflect, reflect, bend, scatter, or diffract the light towards the sensor or sensors.

The sensor array 7 can be a photodiode array 32 without or with filters to measure intensity or colour of the light. Capturing and optionally storing measured light in function of the mirror position results in accurate light property map, e.g. colour or luminance map of the output emitted by the display 3. A comparable result can be achieved by passing the detector array 9 itself over the different display areas 5.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A display device, comprising:
   at least one display area provided with a plurality of pixels, each display area comprising:
      a first transparent or partially transparent sensor for detecting a property of light emitted from the display area into a viewing angle of the display device as well as ambient light, the transparent or partially transparent sensor being located in a front section of said display device in front of said display area; and
      a filter for use with the first transparent or partially transparent sensor in determining the contribution of the ambient light to the output signal of the sensors or for use with the first transparent or partially transparent sensor in determining the luminance of the ambient light, and
   at least partially transparent electrical conductors for conducting a measurement signal from said sensor within said viewing angle for transmission to a controller,
   the at least partially transparent electrodes comprise an electrically conductive oxide.

2. The display device according to claim 1, wherein the filter is an ambient light absorbing filter.

3. The display device according to claim 1, wherein the filter is a display light absorbing filter.

4. The display device according to claim 1, comprising partially transparent sensors located in a front section of said display device in front of said display area.

5. The display device according to claim 4, where the filter covers the first or second partially transparent sensors.

6. The display device according to claim 1, where a first and a second light coupling devices bring light from the display area to the first and/or second sensors respectively.

7. The display device according to claim 6, where the filter covers all or part of one of the first and second light coupling devices.

8. The display device according to claim 1, wherein the filter is provided by a second sensor for detecting polarized light from the said display area into a viewing angle of the display device, which sensor is located in a front section of said display device in front of said display area.

9. The display device according to claim 1, wherein the filter is for filtering a modulation of the light emitted from the display.

10. The display device according to claim 9, wherein the modulation of the light emitted from the display is realized by blinking the backlight.

11. The display device according to claim 1, wherein the filter is an ambient light blocking filter.

12. The display device according to claim 1, further comprising an analytical means for deriving the ambient light intensity from at least the output of the first sensor.

13. The display device according to claim 1, wherein the sensor comprises a photoconductive sensor.

14. The display device according to claim 1, wherein the sensor is a bilayer structure with an exciton generation layer and a charge transport layer, said charge transport layer being in contact with a first and a second electrode.

15. The display device according to claim 1, comprising an at least partially transparent optical coupling device located in a front section of said display device and comprising a light guide member for guiding at least one part of the light emitted from the said display area to the corresponding sensor, wherein said coupling device further comprises an incoupling member for coupling the light into the light guide member.

16. The display device according to claim 15, wherein the light guide member is running in a plane which is parallel to a front surface of the display device and wherein the incoupling member is for laterally coupling the light into the light guide member of the coupling device.

17. The display device according to claim 15, wherein the light guide member is provided with a spherical or rectangular cross-sectional shape when viewed in a plane normal to the front surface and normal to a main extension of the light guide member.

18. The display device according to claim 15, wherein the incoupling member is cone-shaped.

19. The display device according to claim 18, wherein the incoupling member is formed as a laterally prominent incoupling member, which is delimited by two laterally coaxial aligned cones, said cones having a mutual apex and different apex angles.

20. The display device according to claim 15, wherein the incoupling member is a diffraction grating.

21. The display device according to claim 15, wherein the incoupling member further transforms a wavelength of light emitted from the display area into a sensing wavelength.

22. The display device according to claim 21, wherein the sensing wavelength is in the infrared range, particularly between 0.7 and 3 micrometers.

23. The display device according to claim 21, wherein the incoupling member is provided with a phosphor for said transformation.

24. The display device according to claim 15, wherein the coupling device is part of a cover member having an inner face and an outer face opposed to the inner face, said inner face facing the at least one display area, wherein the coupling device is present at the inner face.

25. The display device according to claim 1, wherein the display device simultaneously displays an image and senses a light property in the at least one display area.

26. The display device according to claim 25, wherein the light property is the luminance and wherein color measurements are sensed by the at least one sensor of the display device in a calibration mode.

27. The display device according to claim 25, wherein the light property is the ambient light and wherein color measurements are sensed by the at least one sensor of the display device in a real-time mode.

* * * * *